(12) United States Patent
Brands et al.

(10) Patent No.: US 7,428,517 B2
(45) Date of Patent: Sep. 23, 2008

(54) DATA INTEGRATION AND KNOWLEDGE MANAGEMENT SOLUTION

(76) Inventors: Michaël Rik Frans Brands, Schillerstraat 8, 2050 Antwerpen (BE); Dirk Medard Helena Van Hyfte, Fabrieksstraat 7, 3930 Hamont (BE)

( * ) Notice: Subject to any disclaimer, the term of this patent is extended or adjusted under 35 U.S.C. 154(b) by 813 days.

(21) Appl. No.: 10/377,146

(22) Filed: Feb. 27, 2003

(65) Prior Publication Data

US 2004/0010483 A1   Jan. 15, 2004

Related U.S. Application Data

(60) Provisional application No. 60/360,263, filed on Feb. 27, 2002.

(51) Int. Cl.
  *G06F 17/00* (2006.01)
  *G06F 15/00* (2006.01)
  *G06F 15/18* (2006.01)
  *G06N 5/00* (2006.01)

(52) U.S. Cl. ......................... 706/45; 706/62

(58) Field of Classification Search ............ 706/45
  See application file for complete search history.

(56) References Cited

U.S. PATENT DOCUMENTS

| | | | | |
|---|---|---|---|---|
| 5,148,541 | A * | 9/1992 | Lee et al. .................. 707/2 |
| 5,175,814 | A * | 12/1992 | Anick et al. .............. 715/835 |
| 5,301,109 | A * | 4/1994 | Landauer et al. ............ 704/9 |
| 5,385,556 | A * | 1/1995 | Wang et al. ............... 604/192 |
| 5,386,556 | A * | 1/1995 | Hedin et al. ............... 707/4 |
| 5,418,948 | A * | 5/1995 | Turtle ....................... 707/4 |
| 5,418,951 | A * | 5/1995 | Damashek ................. 707/5 |
| 5,434,913 | A * | 7/1995 | Tung et al. ............ 379/202.01 |
| 5,488,570 | A * | 1/1996 | Agarwal ................... 345/501 |
| 5,490,247 | A * | 2/1996 | Tung et al. ............... 345/501 |
| 5,506,954 | A * | 4/1996 | Arshi et al. ............... 345/501 |
| 5,508,942 | A * | 4/1996 | Agarwal ................... 709/204 |
| 5,511,003 | A * | 4/1996 | Agarwal ................... 709/204 |
| 5,515,296 | A * | 5/1996 | Agarwal ................... 709/204 |
| 5,706,406 | A * | 1/1998 | Pollock ..................... 706/51 |
| 5,794,050 | A * | 8/1998 | Dahlgren et al. ............ 717/144 |
| 6,125,398 | A * | 9/2000 | Mirashrafi et al. .......... 709/236 |
| 6,263,335 | B1 * | 7/2001 | Paik et al. .................. 707/5 |
| 6,374,270 | B1 * | 4/2002 | Maimon et al. ............ 715/500 |
| 6,415,319 | B1 * | 7/2002 | Ambroziak .............. 709/219 |
| 6,424,973 | B1 * | 7/2002 | Baclawski ............... 707/102 |
| 6,434,549 | B1 * | 8/2002 | Linetsky et al. ............ 707/3 |
| 6,480,698 | B2 * | 11/2002 | Ho et al. ................... 434/362 |

(Continued)

OTHER PUBLICATIONS

The Chronological Information Extraction System (CHESS) O'Neill, P.; Woojin Paik; Systems, Man, and Cybernetics, 1998. 1998 IEEE International Conferenced on vol. 2, Oct. 11-14, 1998 pp. 1674-1679 vol. 2.*

(Continued)

*Primary Examiner*—Michael B. Holmes
(74) *Attorney, Agent, or Firm*—Ladas & Parry LLP

(57) ABSTRACT

A multi-dimensional modeling technique and system for knowledge based management, comprises a perceptual engine of relations and concepts; a logical engine of relations and concepts; an inference engine of relations and concepts. The engines operatively connect to a data analysis engine for analyzing an information source, such as a text, sound, video, images, measurement and control data as to its information and knowledge content.

85 Claims, 12 Drawing Sheets

U.S. PATENT DOCUMENTS

| | | | | |
|---|---|---|---|---|
| 6,498,795 B1* | 12/2002 | Zhang et al. | ................ | 370/400 |
| 6,498,921 B1* | 12/2002 | Ho et al. | .................... | 434/362 |
| 6,501,937 B1* | 12/2002 | Ho et al. | .................... | 434/362 |
| 6,510,433 B1* | 1/2003 | Sharp et al. | ................. | 707/100 |
| 6,523,025 B1* | 2/2003 | Hashimoto et al. | ............. | 707/3 |
| 6,523,029 B1* | 2/2003 | Kulyukin | ...................... | 707/5 |
| 6,526,404 B1* | 2/2003 | Slater et al. | .................... | 707/5 |
| 6,539,376 B1* | 3/2003 | Sundaresan et al. | ........... | 707/5 |
| 6,553,383 B1* | 4/2003 | Martin | ...................... | 707/102 |
| 6,571,240 B1* | 5/2003 | Ho et al. | ....................... | 707/5 |
| 6,629,097 B1* | 9/2003 | Keith | ............................ | 707/5 |
| 6,665,680 B2* | 12/2003 | Sharp et al. | ................. | 707/100 |
| 6,678,635 B2* | 1/2004 | Tovinkere et al. | ........... | 702/179 |
| 6,701,326 B2* | 3/2004 | Miyamoto | ............... | 707/104.1 |
| 6,728,700 B2* | 4/2004 | Richards et al. | ................ | 707/3 |
| 6,751,621 B1* | 6/2004 | Calistri-Yeh et al. | ......... | 707/100 |
| 6,847,972 B1* | 1/2005 | Vernau et al. | .............. | 707/101 |
| 6,865,370 B2* | 3/2005 | Ho et al. | .................... | 434/362 |
| 6,944,603 B2* | 9/2005 | Bergan et al. | ................. | 706/45 |
| 6,965,900 B2* | 11/2005 | Srinivasa et al. | ............ | 707/102 |
| 6,970,881 B1* | 11/2005 | Mohan et al. | ............... | 707/102 |
| 7,013,308 B1* | 3/2006 | Tunstall-Pedoe | ......... | 707/104.1 |
| 7,054,856 B2* | 5/2006 | Won et al. | ...................... | 707/3 |
| 7,058,643 B2* | 6/2006 | Vailaya | ....................... | 707/101 |
| 7,113,943 B2* | 9/2006 | Bradford et al. | ............... | 707/4 |
| 7,120,640 B2* | 10/2006 | Rising, III | .................. | 707/102 |
| 7,136,845 B2* | 11/2006 | Chandrasekar et al. | ......... | 707/3 |
| 7,136,846 B2* | 11/2006 | Chang et al. | .................... | 707/3 |
| 7,155,441 B2* | 12/2006 | Rising et al. | ................ | 707/101 |
| 7,158,970 B2* | 1/2007 | Chang et al. | .................... | 707/5 |
| 7,158,983 B2* | 1/2007 | Willse et al. | ................ | 707/101 |

OTHER PUBLICATIONS

Mining ontological knowledge from domain-specific text documents Xing Jiang; Ah-Hwee Tan; Data Mining, Fifth IEEE International Conference on Nov. 27-30, 2005 pp. 4 pp.*

Model transformation: a declarative, reusable patterns approach Duddy, K.; Gerber, A.; Lawley, M.; Raymond, K.; Steel, J.; Enterprise Distributed Object Computing Conference, 2003. Proceedings. Seventh IEEE International Sep. 16-19, 2003 pp. 174-185.*

A pattern for an effective class responsibility collaborator (CRC) cards Fayad, M.E.; Hamza, H.; Sanchez, H.; Information Reuse and Integration, 2003. IRI 2003. IEEE International Conference on 2003 pp. 584-587.*

Robust message integrity for FANS 1 and CNS/ATM Ray, I.L.; Digital Avionics Systems Conference, 1996., 15th AIAA/IEEE Oct. 27-31, 1996 pp. 103-110.*

Antenna research at the Communications Research Centre Petosa, A.; Roscoe, D.J.; Ittipiboon, A.; Cuhaci, M.; Antennas and Propagation Magazine, IEEE vol. 38, Issue 5, Oct. 1996 pp. 7-18.*

* cited by examiner

Human (Pete) has(State:Low) HealthyFunction.
Human (Pete) has(State:39°C) TemperatureFunction.

If Human has(State:35°C) TemperatureFunction Then Human has(State:Low) HealthyFunction.

If Human has(State:39°C) TemperatureFunction Then Human has(State:High) HealthyFunction.

DATA INTEGRATION AND KNOWLEDGE MANAGEMENT SOLUTION

CROSS-REFERENCE TO RELATED APPLICATIONS

The present document is related to and claims benefit from the copending provisional patent application document entitled: "Knowledge Management and Processing System and Method." Ser. No. 60/360,263, filed on Feb. 27, 2002.

FIELD OF THE INVENTION

The present invention relates generally to the field of data analysis, data integration, knowledge management business intelligence, and artificial intelligence (i.e. knowledge-based systems, reasoning systems, etcetera) and, more specifically, to a system, method and computer program to organize, formalize, represent, record, use, retrieve, distribute, manage and integrate data and knowledge in order to support the knowledge life cycle within organizations.

BACKGROUND OF THE INVENTION

Today, it is recognized that knowledge is one of the most important assets of organizations. It is a challenge to be able to manage these knowledge assets. Advanced knowledge management requires thorough analyses and interpretation of all available data either of a technical or a non-technical nature pertaining to one or more application domains and of any type such as a linguistic data type, an image data type, a video data type, a sound data type, a control data type, a measurement data type, olfactive and tactile data types. Knowledge regarding processes, products, markets, technologies and the organization likewise have to be processed. This ultimately enables the organizations to make profit.

The required data analysis, integration and exploiting technology has to meet a number of functional requirements, for the end-user, the domain expert and the knowledge engineer.

For the end-user a knowledge management system should incorporate a multi-disciplinary view on the application domain which incorporates the different kinds of data and knowledge and their concomitant inference techniques to perform the data and knowledge intensive tasks in the organization. The knowledge management system should be able to make the inference transparent to the end user. Further, the system should be able to interoperate with other software components available to the user.

For the domain expert it must be easy to create and to maintain a knowledge base (both declarative and procedural knowledge) and to interact with the knowledge base in his own terminology, in order to incorporate easily the continuously evolving knowledge.

For the knowledge engineer the effort of updating the system should be reduced to a minimum, both when new knowledge becomes available or in the case of new inference paths. Domain specific data and knowledge should be shared by different users processes and reasoning strategies to solve completely different tasks and reasoning components should be reused across divergent application domains. This, to save development effort in building new application domains or advancing existing knowledge management systems.

Most information technology (IT) employed to enable knowledge work appears to target data and information, as opposed to knowledge itself. Present IT systems used to support knowledge management are limited primarily to conventional database management systems (DBMS), data warehouses and data mining tools (DW/DM), intranet/extranet and groupware.

In these existing systems the underlying representation of the reality domain that is used as a starting and reference point for the supported knowledge related activity is not sophisticated enough to model all the different data types, levels and aspects within the reality domain.

In some cases (as e.g. most automatic translation tools or text summarization tools) such a representation or ontology is simply lacking. These tools partially try to solve the lack of an adequate representation of the real world by trying to deduce semantic information (which can be simply described as the meaning of words and sentences) directly from an analysis of the syntactic structure of an utterance. Other systems, such as the more advanced information Extraction Environments (IEE) or Description Logics (DL), are developed as a specific application designed for a specific operational scope such as natural language understanding (KRSS), medical information modeling (GRAIL) or improved data representation (KLIPSCH).

The basic characteristic of these environments or Description Logics is that, even if they make the relevant distinction between procedural and factual knowledge, their formal representation of the reality domain is mono dimensional and oriented to only one data type, being the linguistic one.

This means that most information extraction environments (IEE) and description logics (DL) focus on the representation of factual knowledge (i.e. data) in a framework of formally defined concepts and (explicit) relations between them. In order to make the representation formally as correct as possible, so that it complies in the best possible way with the needs of the inference languages linguistic phenomena or even the notion of language are as much as possible discarded from the representation.

Instead, they try to deal with the reality that concepts can be linked at different levels (e.g. linguistic and logical) by different kinds of relations with the fuzzy and non formally provable distinction between functional (grammatical) and sensible (semantic) relations. This distinction between different relation types is also used to introduce causality and temporal relations within the same mono-dimensional framework.

Within this mono-dimensional framework, that has to fulfil representative tasks at different levels, abstract sanctioning is foreseen for judging "correctness" of representations or analyses. This sanctioning is abstract because it does not imply characteristics of all the actors (concepts, states) in a specific relation, but it is based on the different types of relations, generally following the principle that sensible relations cannot contradict functional relations.

Even if for global modeling purposes this abstract mechanism can be useful to speed up the modeling process, it inevitably leads to accuracy problems and over-generation when the relations are defined at a too high level of abstraction where the distinction between functional and grammatical relations is characterized by a pretty high degree of fuzziness. Or in the opposite case, when the modeling does not reach a sufficient degree of abstraction such that a significant generalization is almost impossible. The consequences for information extraction applications are clear; in the first case the system is not able to discard "incorrect" information and in the second case correct information is easily rejected as "incorrect".

Another problem of most description logics (DL) and information extraction environments (IEE) is the fact that there is no automatic link between the descriptive modeling of the factual or logical knowledge and the inference mechanism that is used to exploit the modeled information. In other words, since information extraction environments (IEE) and description logics (DL) are mainly descriptive environments they do not provide the adequate infrastructure to exploit the represented knowledge. Therefore, other environments or inference languages such as OIL or ProtéGé have been developed. However, the problem is that description logics essentially are logical data representations, whereas inference languages mostly rely on a frame based data representation and both representations are not completely compatible, which means that they cannot fully exploit each other.

Accordingly, the technology required for an intelligent knowledge management and processing system cannot be built in terms of existing database, technology, because such technology does not support the rich representational structure and inference mechanisms required for knowledge based systems and often has problems with efficiently storing different data types within the same environment.

Most of the current state of art knowledge based systems are rule based systems in which the knowledge is represented at a single level of abstraction and implicitly combined knowledge about 'how' to perform a task, 'what' is in the domain and 'why' things work. While it was initially thought that this would make systems fairly easy to develop, in fact it leads to several problems related to rule based inference.

These known expert systems represent the declarative knowledge about the application domain and the procedural or problem solving knowledge about how to organize the reasoning process in a mixed representation, i.e. rules. In this manner, the knowledge which is incorporated in the rules of these expert systems cannot easily be shared or reused for other application domains, which makes the development of such systems a time consuming task. Further, the validation of their knowledge base is difficult because knowledge about the application domain is scattered throughout the rule base. A practical limitation of rule based systems is the complexity of maintaining these systems with a large number of rules.

A major shortcoming of the existing technologies disclosed above is generally caused by the "semantic interoperability of data problem", described by Heflin and Handler in "Semantic Interoperability on the Web", Extreme Markup Languages 2000, pp. 1-15, as "the difficulty in integrating resources that were developed using different vocabularies and different perspectives on the data". However, in this definition the semantic interoperability problem is limited to the fact that almost any data storage environment uses its own storage scheme and its own unique set of keywords to structure the data.

But according to many other authors, the "semantic interoperability problem" is even more complex because it relates to the difficulty of integrating data of types as different as text data, sound data, video data, image data, measurement data, control data and olfactive and tactile data in such a way that the knowledge they carry can be represented, used and brought together in a uniform way without a significant loss of meaning.

Solutions to resolve the semantic interoperability problem developed till now can easily be categorized into two main types.

A first set of essentially linguistic solutions trying to resolve the semantic interoperability as it is defined by Heflin and Handler. These solutions like DAML, OML, CKML essentially focus on resolving the linguistic problem of integrating different keyword sets into a usable framework. In these solutions concepts are defined as a superset of "abstract" keywords under which the individual keywords out of different sets can be organized. The concepts can then be used to execute search operations or document categorization and clustering operations. The most performing solutions in this set use concepts defined in the way described above and provide a set of "ontological relations" in order to link the concepts together into a structured ontology. These structured one-dimensional ontologies are then used to conduct the search operations or document categorization and clustering operations and to extract information out of text information sources.

Information extraction driven by these structured ontologies consists in most cases of a technique that tries to identify concepts in a given text source, by scanning the text for the presence of keywords defining these concepts. In a second step it is tried to establish links between the concepts. Often this is done by a analyzing the syntactic structures of the sentences in the text source in an attempt to detect syntactic dependencies that can be mapped onto the ontological relations established between the concepts or by using probability calculations to establish which of the ontological relations is most likely to link the concepts co-occurring in the text. The result of these operations is supposed to represent the linguistically expressed knowledge in the text into a formal ontology based structure that can be used to drive search operations or document categorization and clustering operations in a more efficient way.

Because of the fact that these systems try to drive free text searches and to yield a formal result they are often the to solve the "language to knowledge bottleneck" which is another way to describe the semantic interoperability problem in the definition of Heflin and Handler. An inconvenience of these systems is that they are not suited for analyzing and integrating other than linguistic, or textual data and that they do not provide internal mechanisms to fully exploit the formally represented information they contain. For this full exploitation, being for example delivering decision advice or formulating complex queries the ontologies have to be coupled to external not fully compatible inference languages as for example OIL.

A second set of solutions essentially focuses on resolving the problem of integrating data of different types with each other. Most often these solutions concentrate on a flexible storage environment often called a multi media database wherein the different data types can be stored. The link between the different data is than made by the fact that the data are organized according to a common set of (manually assigned) keywords. The most performing between these systems provide an ontology like keyword set without offering the possibility of linking data with relations because of the fact that non-linguistic data do not present syntactical information.

SUMMARY OF THE INVENTION

It is an object of the present invention to provide a system, method and computer program for a knowledge based management and processing system to support the knowledge life cycle within organizations.

It is another object of the present invention to provide a system, method and computer program to establish maintain and integrate the dynamic and multi-variable nature of different data types pertaining to different application domains.

It is a further object of the present invention to provide a system method and computer program for representing data and knowledge in a multi-hierarchically manner at various levels of detail and from various points of view.

It is a still further object of the present invention to provide a system, method and computer program for representing data and knowledge in a multi-hierarchical manner at various levels of detail and from various points of view.

It is a further object of the present invention to provide a hierarchical modeling system, which is interactive and comprises auto-updating and self-learning capabilities.

It is still another object of the present invention to provide a language and data type independent data and knowledge management tool.

It is another object of the present invention to provide a task specific knowledge acquisition tool to form the knowledge base of a corporate memory.

It is another object of the present invention to provide a categorization system, visualization system, a distribution system, a query system, a process analysis system, a reasoning system, a decision advisory system, a summarizing system and a translation system to perform several data and knowledge operations, including organizing, formalizing, visualizing, querying, distributing, exploiting, extracting, translating, transforming data and creating knowledge.

It is still another object of the present invention to provide a distribution and workflow management tool for specific distribution of knowledge based on the modeling system of the present invention.

Based on the above analysis of the prior art modeling environments and techniques, in accordance with a first aspect of the present invention, a novel multi-dimensional computer controlled data analyzing technique is proposed allowing to overcome the drawbacks disclosed, and comprising the steps of:

defining concepts associated with an application domain, a concept specifies an amount of information relating to the application domain and is expressed in a logical dimension and a perceptual dimension;

defining relations between the concepts, a relation specifies an informative association between concepts of the application domain in at least one of the logical dimension and the perceptual dimension;

defining concept-relation-concept (CRC) patterns for the application domain, in the logical and perceptual dimension, and analyzing the data in the logical and perceptual dimensions using the concepts, relations and CRC-patterns disclosed for the application domain.

The present invention is based on the insight that a multi-dimensional modeling method wherein data to be analyzed are represented as functions of a logical and a perceptual dimension is particularly suited for integrating different types of data in a standardized formal and informative representation and to resolve the semantic interoperability problem in the broadest sense.

In the data analyzing technique of the present invention, concepts have a specific meaning and information value, and each concept is defined within a definite part of reality, a so called domain. A concept can appear with different characteristics in different domains. The basic element for representing a minimal entity carrying knowledge, being the informative association of two specified amounts of information is the CRC-pattern.

The correlation and interrelation between different reality domains is modeled in a Domains Topology (DT), which at the most abstract level defines a set of basic concepts and relations returning in all domains. However, in each of the domains their combination and operational actualisation will be unique.

In the modeling technique of the present invention, concepts have a specific appearance for each of the above dimensions and are defined by combining any or all of them. Relations have to be functionally defined for their perceptual aspect, and formally for their logical aspect.

In a further embodiment of the present invention, the concepts relations and CRC-patterns are defined in an inference dimension specific for an application domain thereby providing an fully integrated means for inferencing and reasoning with the data. The CRC-pattern may be characterized by having a hierarchical structure defined by the relation and a master concept and a slave concept.

In a further embodiment of the present invention, wherein the logic dimension comprises a domain specific implicit or explicit logical feature set and wherein the concepts and relations are expressed as subsets of the logical feature set and wherein validity is assessed of the defined CRC-patterns in the logical dimension.

In a yet further embodiment of the present invention, the perceptual dimension comprises a domain specific implicit or explicit perceptual feature set and wherein the concepts and relations are expressed as subsets of the perceptual feature set and wherein validity is assessed of the defined CRC-patterns in the perceptual dimension.

In a further embodiment of the present invention, the inference dimension comprises compositional concepts being domain specific combinations of CRC-patterns in the logical dimension and wherein domain specific combinations are defined of at least one CRC-pattern in the logical dimension and a specific set of perceptual features other than concepts defined in the perceptual dimension and other than relations defined in the perceptual dimension, and wherein validity of the combinations and compositional concepts is assessed.

In a still further embodiment of the present invention, a group of boolean, logical, spatial, temporal and evaluative states is defined, a state being a modifier, refining the information value of a CRC-pattern and having no information value independent from CRC-patterns and wherein states are associated with selected ones of the CRC-patterns, compositional concepts and combinations of CRC-patterns.

In another embodiment of the invention, inference pathways are defined combining selected CRC-patterns, compositional concepts, combinations of CRC-patterns and compositional concepts having associated states, and wherein valid sequences of states associated to a pathway are defined.

In a further embodiment of the present invention, data pertaining to an application domain is analyzed following the steps of:

identifying in the data concepts and relations as defined in the logical and perceptual dimensions;

forming CRC-patterns in the logical and perceptual dimensions of the concepts and relations identified in the data, and assessing the CRC-patterns as to their validity in the logical and perceptual dimensions of an application domain.

The latter embodiment further may comprise the steps of:

forming and assessing domain specific combinations of CRC-patterns in the logical dimension, and assessing combinations of CRC-patterns using domain specific combinations of at least one CRC-pattern in the logical dimension and a specific set of perceptual features other than concepts defined in the perceptual dimension and other than relations defined in the perceptual dimension.

In a further embodiment of the present invention, the steps of:

forming and building inference pathways by combining selected CRC-patterns, compositional concepts and combinations of CRC-patterns and compositional concepts having associated states;

forming a sequence of states by combining individual states associated with CRC-patterns and compositional concepts in an inference pathway, and assessing the sequence of states according to valid sequences of states associated with the pathway are performed.

According to a further embodiment of the invention, new concepts and relations other than the defined concepts and relations are established from the data and the new concepts and relations are matched with defined concepts and relations based on logical and perceptual feature convergence and difference in a domain.

In a still further embodiment of the invention, the application domains are related to each other according to convergence of their feature sets in the logical and perceptual dimensions, and of their definitions of the concepts, relations and CRC-patterns in the logical and perceptual dimensions and wherein data pertaining to different application domains are combined in accordance with the relatedness of the domains.

According to the invention, new concepts and relations may combined with each other and with defined concepts and relations defining new CRC-patterns and wherein the new CRC-patterns are assessed according to their compliance with logical and perceptual feature sets in a domain. Selected new CRC-patterns are added to the defined CRC-patterns for the application domain.

The invention further provides that assessed CRC-patterns, assessed compositional concepts and assessed combinations of CRC-patterns are combined into clusters expressed in the logical, perceptual and inference dimensions representing the data, by analyzing information parts of the data using concepts and relations common to the CRC-patterns, compositional concepts and combinations of CRC-patterns.

New CRC-patterns can be added to clusters based on concepts and relations common to the clusters.

For representation purposes, the method according to the invention provides that the clusters are combined into a scheme representing the data based on concepts and relations common to the clusters.

The scheme may be arranged according to at least one of cluster length, frequency of appearance of clusters, frequency of appearance of concepts, frequency of appearance of relations, frequency of appearance of concepts and relations in a cluster and information value of concepts, relations, and combinations of concepts and relations in CRC-patterns and clusters.

The method according to the invention is applicable to plural types of data pertaining to an application domain defined in the perceptual dimension, comprising any of a linguistic data type, an image data type, a video data type, a sound data type, a control data type, a measurement data type, olfactive and tactile data types and wherein different data types are associated in a formal and informative manner based on the definitions of concepts, relations and CRC-patterns in the logical, perceptual and inference dimensions.

The method according to the invention, in a further embodiment thereof, provides the steps of:

defining at least one field of interest consisting of selected CRC-patterns;

assigning to each of the CRC-patterns an information value typical for a field of interest assessing analyzed data as to its compliance with the field of interest by comparing CRC-patterns representing the analyzed data and the field of interest, providing a compliance factor, and calculating a field correlation factor using the information value and the compliance factor.

The correlation factor may be calculated for a plurality of different fields of interest.

In a yet further embodiment, the method according to the invention comprises the steps of:

defining at least one user profile consisting of selected CRC-patterns;

assigning to each of the CRC-patterns an information value typical for a field of interest assessing analyzed data as to its compliance with the user profile by comparing CRC-patterns representing the analyzed data and the field of interest, providing a compliance factor, and calculating a user correlation factor using the information value and the compliance factor.

According to the invention, the user profile is either one of a subset or a superset of either one of at least one field of interest and at least one application domain.

The correlation factor may be calculated for a plurality of different user profiles.

In a further embodiment the invention provides that analyzed data are categorized in accordance with the field correlation factor and distributed according to the user correlation factor.

In accordance with the invention, an application domain can be visualized by forming clusters of concepts and relations defined in the logical, perceptual and inference dimensions and associated states.

Further, the schemes of clusters can be combined with the domain visualizations based on concepts and relations common to the schemes and domain visualizations.

In a yet further embodiment of the method according to the invention, the presence of structures of co-occurring CRC-patterns in analyzed data is detected, and wherein recurring sequences of states associated with the structures are assessed.

In a still further embodiment of the method according to the invention, detected structures of co-occurring CRC-patterns and sequences of associated states are combined into inference pathways and inference pathways are defined as processes if the sequence of associated states determines a dependency between concepts at both ends of a pathway.

In accordance with the invention, procedures are defined as specific combinations of processes and determined by specific sequences of associated states. The processes and procedures may be used for categorizing and distributing analyzed data.

In another embodiment of the method according to the invention, at least one procedure and at least one trigger are combined into a task, a trigger being any of a specific perceptual concept and a specific state, and wherein the task is performed by executing the at least one procedure in response to the at least one trigger.

The method according to the invention further provides that data are searched in function of a query, the query comprising at least one of a specified concept, a specified combination of a concept and a relation, a specified CRC-pattern, a specified compositional concept, a specified inference pathway, a specified process, a specified procedure and specified combinations thereof in at least one of the logical, perceptual and inference dimensions.

In accordance with the invention, a broad search is based on the definition of all concepts and relations of the query in the logical dimension and implies all perceptual features of the concepts and the relations and wherein a narrow search is based on at least one specified feature of all concepts and relations of the query pertaining to the definition of the concepts and the relations. In the perceptual dimension and a combined search is based on the definition in the logical dimension of at least one of the concepts and relations of the query and of the definition of at least one specified feature in the perceptual dimension of at least one of the other concepts and relations of the query.

For searching internet and other data bases, in a yet further embodiment of the invention, a complete set of boolean search strings describing the queries is generated.

The invention in a still other embodiment thereof provides that a summary of analyzed data can be obtained based on clusters of CRC-patterns, selected in accordance with a specified level of information value, of concepts and relations in an analysis scheme of the data, and wherein the selected clusters are adapted into a correct representation in at least one of the data types comprised in the perceptual dimension.

In another embodiment of the method according to the invention, data, analyzed into clusters of CRC-patterns, of a first data type comprised in the perceptual dimension are transformed into a correct representation in at least one second data type comprised in the perceptual dimension, by replacing analyzed feature sets of the first data type defining the clusters with features sets of the perceptual dimension pertaining to the second data type describing the same clusters and referring to the same concepts and relations defined in the logical dimension.

For translation purposes the invention provides, in a still further embodiment thereof, that analyzed data of the linguistic data type, the video data type and the sound data type belonging at least partially to at least one natural language covered by the feature set defining the perceptual dimension are translated into a correct representation in another natural language covered by the feature set defining the perceptual dimension.

For analyzing data of different data types, the method according to the invention provides further the steps of:

converting data of one of the types comprised in the perceptual dimension having any file format into a format for processing the data type, detecting information parts within the converted data removing non-informative data from the information parts by assessing them against predefined non-informative data, determining frequency of occurrence of informative data and rerating the frequency of certain predefined informative data, providing rated information blocks, and organizing the rated information blocks into data for analyzing same using the concepts and the relations.

The invention provides also a computer controlled system for analyzing data pertaining to at least one application domain, the system comprising:

a concepts repository comprising concepts associated with an application domain, a concept specifying an amount of information relating to the application domain and expressed in a logical dimension and a perceptual dimension;

a relations repository comprising relations between the concepts, a relation specifying an informative association between concepts of the application domain in at least one of the logical dimension and the perceptual dimension;

a CRC-pattern repository comprising CRC-patterns defined for the application domain, in the logical and perceptual dimension, and an analysis engine arranged for analyzing the data in the logical and perceptual dimensions using the concepts, relations and CRC-patterns disclosed for the application domain.

In a further embodiment, the system is provided with an inference repository comprising the concepts relations and CRC-patterns expressed in an inference dimension specific for an application domain.

In another embodiment of the system according to the invention, the concept repository and relation repository comprise a domain specific logical feature set and wherein the concepts and relations are expressed as subsets of the logical feature set.

In a further embodiment of the invention, the analysis engine is arranged for assessing validity of the CRC-patterns in the logical dimension.

In a yet further embodiment of the system according to the invention, the concept repository and relation repository comprise a domain specific perceptual feature set, and wherein the concepts and relations are expressed as subsets of the perceptual feature set.

In the system according to the invention, the analysis engine is arranged for assessing validity of the CRC-patterns in the perceptual dimension.

In a still further embodiment of the system according to the invention, the inference repository comprises compositional concepts defined as domain specific combinations of CRC-patterns in the logical dimension and comprising domain specific combinations of at least one CRC-pattern in the logical dimension and a specific set of perceptual features other than concepts defined in the perceptual dimension and other than relations defined in the perceptual dimension.

The analysis engine may be arranged for assessing validity of the combinations and compositional concepts in the inference dimension.

In a further embodiment of the system according to the invention, at least one state—a state being a modifier, refining the information value of a CRC-pattern and having no information value independent from CRC-patterns—of a group of boolean, logical, spatial, temporal and evaluative states is associated with selected ones of the CRC-patterns, compositional concepts and combinations of CRC-patterns in the inference repository.

According to another embodiment of the invention, the inference repository comprises inference pathways consisting of combinations of selected CRC-patterns, compositional concepts, combinations of CRC-patterns and compositional concepts having associated states, and comprising valid sequences of states associated to a pathway.

In a yet further embodiment of the system according to the invention, the analysis engine comprises:

a logical engine arranged for identifying in the data concepts and relations defined in the logical dimension;

a perceptual engine arranged for identifying in the data concepts and relations defined in the perceptual dimension, and CRC-pattern assessment means arranged for identifying the CRC-patterns as to their definitions in the logical and perceptual dimensions of an application domain.

The system of the invention further may comprise a logical exclusions repository comprising combinations of concepts and relations providing invalid CRC-patterns and wherein the analysis engine comprises invalid logical CRC-pattern detection means excluding invalid CRC-patterns.

In a still further embodiment of the system according to the invention, the analysis engine comprises an inference engine arranged for:

forming and assessing domain specific combinations of CRC-patterns in the logical dimension, and assessing defined compositional concepts and assessing combinations of CRC-patterns using domain specific combinations of at least one CRC-pattern in the logical dimension and a specific set of perceptual features other than concepts defined in the perceptual dimension other than relations defined in the perceptual dimension.

In yet further embodiment, the inference engine further comprises means arranged for:

forming and building inference pathways by combining selected CRC-patterns, compositional concepts and combinations of CRC-patterns and compositional concepts having associated states;

forming a sequence of states by combining individual states associated with CRC-patterns and compositional concepts in an inference pathway, and assessing the sequence of associated states according to valid sequences of states associated with the pathway.

In a yet further embodiment the system according to the invention comprises means for:

establishing new concepts and relations other than the defined concepts and relations in the data, and matching the new concepts and relations with defined concepts and relations based on logical and perceptual feature convergence and difference in a domain.

In another embodiment of the system according to the invention, the means for matching new concepts and relations are arranged for:

combining the new concepts and relations with each other and with defined concepts and relations to define new CRC-patterns, and assessing the new CRC-patterns according to their compliance with logical and perceptual feature sets in a domain.

The system of the invention further may comprise means to add selected new CRC-patterns to the defined CRC-patterns in the CRC-patterns repository.

In a yet further embodiment the system according to the invention comprises a categorization engine arranged for:

defining at least one field of interest consisting of selected CRC-patterns;

assigning to each of the CRC-patterns an information value typical for a field of interest assessing analyzed data as to its compliance with the field of interest by comparing CRC-patterns representing the analyzed data and the field of interest, providing a compliance factor, and calculating a field correlation factor using the information value and the compliance factor.

The categorization engine may be further arranged for calculating the correlation factor for a plurality of different fields of interest.

In another embodiment of the invention, the categorization engine is arranged for:

defining at least one user profile consisting of selected CRC-patterns;

assigning to each of the CRC-patterns an information value typical for a field of interest;

assessing analyzed data as to its compliance with the user profile by comparing CRC-patterns representing the analyzed data and the field of interest, providing a compliance factor, and calculating a user correlation factor using the information value and the compliance factor.

In another embodiment of the invention, the categorization engine is arranged for calculating the correlation factor for a plurality of different user profiles, and/or is arranged for categorizing the analyzed data in accordance with the field correlation factor.

For distribution purposes, the invention comprises, in a yet further embodiment, a distribution engine arranged for distributing the analyzed data in accordance with the user correlation factor.

For visualization purposes, in a still further embodiment, the invention comprises a visualization engine arranged for visualizing an application domain by forming clusters of concepts and relations defined in the logical, perceptual and inference dimensions and associated states.

In another embodiment of the invention, the visualization engine is arranged for combining assessed CRC-patterns, assessed compositional concepts and assessed combinations of CRC-patterns into clusters expressed in the logical, perceptual and inference dimensions representing the data, by analyzing information parts of the data using concepts and relations common to the CRC-patterns, compositional concepts and combinations of CRC-patterns.

The visualization engine may be further arranged for adding new CRC-patterns to clusters based on concepts and relations common to the clusters.

The visualization engine may be also arranged for combining the clusters into a scheme representing the data based on concepts and relations common to the clusters.

In a yet further embodiment of the invention, the visualization engine is arranged for composing the scheme in accordance with at least one of cluster length, frequency of appearance of clusters, frequency of appearance of concepts, frequency of appearance of relations, frequency of appearance of concepts and relations in a cluster and information value of concepts, relations, and combinations of concepts and relations in CRC-patterns and clusters.

In another embodiment of the invention, the visualization engine is arranged for combining the schemes of clusters with the domain visualizations based on concepts and relations common to the schemes and domain visualizations.

The system of the invention, in a further embodiment thereof, is provided with a process analysis engine arranged for assessing presence of structures of co-occurring CRC-patterns in analyzed data, and for assessing recurring sequences of states associated with the structures.

The process analysis engine may be arranged for detecting structures of co-occurring CRC-patterns and for combining sequences of associated states into inference pathways, inference pathways are defined as processes if the sequence of associated states determines a dependency between concepts at both ends of a pathway.

In another embodiment of the invention, the process analysis engine is arranged for detecting procedures as specific combinations of processes and specific sequences of associated states.

In a yet further embodiment of the invention, the categorization engine is arranged for categorizing analyzed data according to the processes and the procedures.

In a still further embodiment of the invention, the distribution engine is arranged for distributing analyzed data according to the processes and the procedures.

In another embodiment the system according to the invention comprises a decision advice engine arranged for combining at least one procedure and at least one trigger into a task, a trigger being any of a specific perceptual concept and a specific state, and for performing the task by executing the at least one procedure in response to the at least one trigger.

In a further embodiment the system according to the invention comprises a search engine arranged for searching data in function of a query comprising at least one of a specified concept, a specified combination of a concept and a relation, a specified CRC-pattern, a specified compositional concept, a specified inference pathway, a specified process, a specified procedure and specified combination thereof in at least one of the logical, perceptual and inference dimensions.

In a yet further embodiment, the search engine is arranged for performing a broad search based on the definition of all concepts and relations of the query in the logical dimension and implies all perceptual features of the concepts and the relations, a narrow search based on at least one specified feature of all concepts and relations of the query pertaining to the definition of the concepts and the relations in the perceptual dimension, and a combined search based on the definition in the logical dimension of at least one of the concepts and relations of the query and of the definition of at least one specified feature in the perceptual dimension of at least one of the other concepts and relations of the query.

For interacting with internet and other data bases, the search engine is arranged for generating a complete set of boolean search strings describing the queries.

In another embodiment the system according to the invention comprises a summarizing engine arranged for generating a summary of analyzed data based on clusters of CRC-patterns, selected in accordance with a specified level of information value, of concepts and relations in an analysis scheme of the data and for adapting the selected clusters into a correct representation in at least one of the data types comprised in the perceptual dimension.

In an yet other embodiment the system according to the invention comprises a translation engine arranged for transforming data, analyzed into clusters of CRC-patterns, of a first data type comprised in the perceptual dimension into a correct representation in at least one second data type comprised in the perceptual dimension, by replacing analyzed feature sets of the first data type defining the clusters with features sets of the perceptual dimension pertaining to the second data type describing the same clusters and referring to the same concepts and relations defined in the logical dimension.

The translation engine may be further arranged for translating analyzed data of the linguistic data type, the video data type and the sound data type belonging at least partially to at least one natural language covered by the feature set defining the perceptual dimension into a correct representation in an other natural language covered by the feature set defining the perceptual dimension.

In another embodiment the system according to the invention comprises a plurality of preprocessing engines, each preprocessing engine being arranged for preprocessing one of the data types defined in the perceptual dimension by:

converting data of one of the data types comprised in the perceptual dimension having any file format into a format for processing the data type;

detecting information parts within the converted data;

removing non-informative data from the information parts by assessing them against predefined non-informative data;

determining frequency of occurrence of informative data and rerating the frequency of certain predefined informative data, providing rated information blocks, and organizing the rated information blocks into data for analyzing same using the concepts and the relations.

For updating purposes, in a yet further embodiment the system according to the invention is provided with an updating engine arranged for updating the concepts repository, the relations repository, the CRC-patterns repository, the logical exclusions repository and said inference repository by adding new concepts, relations, CRC-patterns, compositional concepts, combinations of CRC-patterns, inference pathways, processes and procedures.

The invention further comprises a computer program product comprising a computer program arranged for performing the method according to any of the embodiments of the invention disclosed above, if loaded into a memory of an electronic processing device. The computer program product may comprise any of a group of data carrying devices including floppy discs, CD-roms, DVDs, tapes, memory stick devices, zip drives, flash memory cards, remote access devices, hard disks, semi-conductor memory devices, programmable semi-conductor memory devices, optical disks, magneto-optical data storage devices, and ferro electric data storage devices.

The above-mentioned embodiments and other features and advantageous of the invention are illustrated in the following description with reference to the enclosed drawings.

DETAILED DESCRIPTION OF THE EMBODIMENTS

Figure 1:
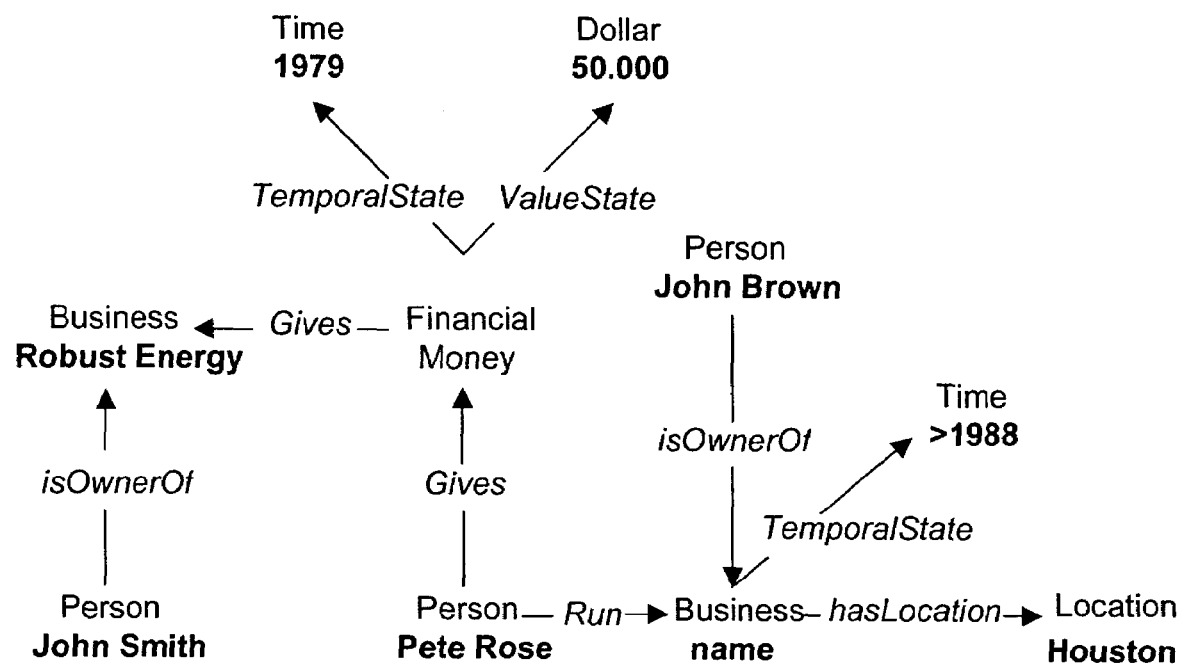
FIGS. 1 and 2 show, in a graphic manner, representations of (part of) analyzed data in accordance with the present invention.

For commodity of the reader all examples referring to the perceptual dimension are providing data of the linguistic type, being the least abstract one of all the data types covered by the linguistic dimension.

The basic principle of the modeling technique according to the present invention is the fact that knowledge is always modeled in function of and as a function forming part of a specific domain. In the context of the present invention knowledge is an explicitly defined relationship between elements of a classification system. Information is a structuring of data, i.e. a multi-hierarchic classification of elements. Data are considered to represent facts.

This means that the basic elements carrying the knowledge, being concepts and relations, are always defined within a specific knowledge domain or as functions of a specific knowledge domain and always have to be interpreted within a specific domain.

The representation of the knowledge within a specific domain by means of a network of concepts and relations is called an ontology. According to the degree of abstractness of their definition Concepts (C) can be divided in to Concept Classes (CC). Sub-Classes (SC), and Instantiations (I). Abstractness has to be defined as the extent to which different basic characteristics have to be used to determine the concept. In a logic notation this can be expressed in the following manner:

```
Char = set of possible characteristics describing a domain:
Char = {x(Human), y(Being), z(Female), m, n, . . . }
Concept Class (CC) = {x}
Sub-Classes (SC) = x and y
    thus SC is a subset of CC
Concept = x and y and z and . . .
    thus C is a subset of SC.
Instantiation can be defined as:
    L = all elements of Natural Language (NL)
    I = {] ∈ L|] represents Concept or ] represents
Concept Class or ] represents Sub Class}
```

Each definition of a concept is determined at a time state T so that changes in the knowledge of the domain can be kept in an evolutional model.

The basic concepts as atomically described in the paragraph above, in accordance with the present invention, are interpreted within a domain as a combinatory function of the following basic dimensions or engines:

a perceptual engine: the perceptual engine covers the world of perceptual representations of concepts and relations between these concepts. At perceptual level concepts and relations are presented as sets of perceptual features (being significant forms under which these concepts and can be identified within linguistic data, image data, video data, sound data, control data, measurement data, olfactive data and tactile data). These representations always have to be associated with the most abstractly defined logical concept possible.

a logical or factual engine: the logical engine covers the formal definition of concepts and relations by means of a well-defined set of Boolean features and provides the formal representation of static logical or factual relations between concepts, wherein:

similarity between concepts and relations is defined by intersection of features;

relations are always defined between concepts and validated on specific features, or a combination of feature states; and differences between relation types are based on the combination of feature states they need for validation (00,01,10, 11).

When two concepts are linked together by means of a relation. The concept providing the opening feature or feature state is called the Master Concept and the concept providing the closing feature or feature state of the relation is called the Slave Concept.

According to the definition of abstractedness and to the definition of CC;SC and C in the first part of this paragraph the logical dimension of the domain description is ruled by two very important basic principles:

The principle of Non-Contradiction: This means that within the logical space relations between two different Sub Classes can, logically, never infringe a relation established between the respective Classes to which the Sub Classes pertain.

(e.g. if (TransportationDevice_Uses_Energy) is True AND [Uses]=–[Generates] MotorisedTransportationDevice_Generates_Energy is UNTRUE)

The principle of logical inheritance: : This means that within the logical space Classes or Sub Classes automatically pass on the relations for which they are master respective Sub Classes and Concepts (e.g. if TransportationDevice_Uses_Energy is TRUE then MotorisedTransportationDevice_Uses_Energy is TRUE)

a reasoning or inference engine: the inference engine combines linguistic elements, logical elements or a mixture of both into compositional concepts and allows to add causality or temporal states to logical elements.

Compositional concepts are distinguished as:

free compositional concepts: combine logical concepts (or a subset of their specific perceptual representations) and logical relations (or a subset of their specific perceptual representations), into a fixed sequence of concepts and relations based on static feature state convergence or difference.

sensible compositional concepts: combine logical concepts(or a subset of their specific perceptual representations) and logical relations(or a subset of their specific logical representations) into a sensible compositional concept by introducing them into a fixed framework of causal or temporal dependencies that describes a static sequence of feature states (over a combination of logic relations) or a dynamic sequence of feature state changes over a combination of logic relations.

For example: "Pete is ill so he cannot go to school".

Human(Pete)_GoesTo(state:Untrue)_Institute(School) && Human(Pete) has(state:True) (Disease).

At this reasoning level relations can have two different kinds of states:

logical, Boolean states being true or false within the actualized context of a compositional concept or a textual, more precisely sentential, co-occurrence; or linguistic or psychological states that can be defined as evaluative states e.g. likelihood, appropriateness, wishfulness, . . . .

The interdependence and intra-dependence of the different knowledge domains can be modeled by means of a specific ontology, called Domain Topology (DT), consisting of the most abstract concept classes and there different domain dependent definitions and abstract domain interrelatedness.

Now the operational states are illustrated for gaining knowledge from an unstructured text, or in general any source of information presenting data of one of the types covered by the perceptual dimension, by forming C-R-C (Concept-Relation-Concept) patterns in accordance within the present invention as disclosed above. Analyzed are sentences 45 and 46, as indicated below between parentheses.

EXAMPLE 1

An Example of an Unstructured Text

(45) "Pete Rose ran a business for John Brown in Houston and joined a partnership with John Brown and Frank Klein, ABB's frontman in Houston's Money Bank."

(46) "In 1979, Smith's first business, Robust Energy, received financing from Pete Rose, a Houstonian and close family friend."

The output of the text information analysis process in accordance with the invention is the following:

45 1 Pete Rose <<Person>> <Important Known Information>
45 2 ran [SIntentionallyCausedProcess] <Secondary Relation>

45 4 business <<Business>> <Important Known Information>
45 6 John Brown <<Person>> <Important Known Information>
45 9 Houston <<GeographicalRegion>> <Secondary Information>
45 13 partnership [SConnectiveRelation] <Secondary Relation>
45 15 John Brown <<Person>> <Important Known Information>
45 18 Frank Klein <<Person>> <Secondary Information>
45 25 bank <<FinancialCompany>> <Important Known Information>
46 2 1979 <Time> <Secondary Information>
46 3 Smith <Person><Important Known Information>
46 4's [isOwnerOf] <Secondary Relation>
46 6 Robust Energy <Business> <Important Known Information>
46 9 received from [gives] <Important Known Information>
46 10 financing <financial Money><Secondary Information>
46 13 Pete Rose <Person><Important Known Information>

Legend: Important Known Information refers to primary information in the text that is also represented in the ontology.

Secondary relation refers to a relation in the text which has a low information value at text level and is represented in the ontology.

Secondary Information refers to information present in the ontology and present in the text with low information value.

Between << >> are the concept classes.

Between [ ] are the relation types.

The numbers refer to the sentence number and the position of the word or words in the specific sentence, i.e. their number in sequence.

The next process is the creation of an ontological map of the document. This ontological map represents the concept classes and relation types together with their respective instantiations occurring in the text. A typical ontological map may look like:

| | |
|---|---|
| Person | 0.301471 |
| Frank Klein; | 0.0416667 |
| John Brown; | 0.0833333 |
| Pete Rose; | 0.05882 |
| SIntentionallyCausedprocess | 0.0588235 |
| ran; | 0.0588235 |
| SConnectiveRelation | 0.0588235 |
| partnership; | 0.0588235 |
| Geographical Region | 0.0588235 |
| Houston; | 0.0588235 |
| FinancialCompany | 0.0588235 |
| bank; | 0.0588235 |
| Business | 0.0588235 |
| business; | 0.0588235 |

The numerical values refer to the degree of information in the text.

The next step in the process is the creation of C-R-C profiles between the concept classes or ontological map:

<<Person>> [SIntentionallyCausedProcess]
<<Business>><<Business>> [SConnectiveRelation] <<Person>>
<<Business>> [SLocativeRelation] <<GeographicalRegion>>
<<Person>> [SConnectiveRelation] <<Person>>

In a next step logical relations between the in the text occurring instantiations of the concept classes are formed. These relation patterns can be represented in the knowledge base, where new elements can be updated.

Pete Rose<Run>Name Business<OwnedBy>John Brown
Pete Rose<Gives>money<Given>Robust Energy<OwnedBy>Smith.

A graphic representation of part of the knowledge map of the above text is illustrated in FIG. 1.

EXAMPLE 2

Palladio (4) "The results of these studies appear in the buildings which he constructed, of which the earliest known is the Palazzo Godi at Lonedo (1540). (5) The execution of his design for the rebuilding of the basilica in his native town was commenced in 1549. (6) The colonnades of this basilica are his most famous work. (7) His Arco di Trionfo, also at Vicenza, is even now the best, modern imitation of a Roman triumphal arch."

4 7 in the [hasLocation] <Important Relation>
4 9 buildings <<Construction>> <Secundary Information>
4 11 he <New Information>
4 12 constructed [SIntentionallyCausedProcess] <Secundary Relation>
4 18 is the <New Information>
4 20 Palazzo Godi <<Construction>> <Secundary Information>
4 23 Lonedo <<GeographicalRegion>> <Secundary Information>
5 3 of his <New Information>
5 8 rebuilding [SIntentionallyCausedProcess] <Secundary Relation>
5 9 of the <New Information>
5 11 basilica <<Construction>> <Secundary Information>
5 13 his [SPositionalRelation] <Important Relation>
6 2 colonnades <<Construction>> <Secundary Information>
6 5 basilica <<Construction>> <Secundary Information>
6 7 his [SpositionalRelation] <Important Relations
6 9 famous <New Information>
6 10 work [SIntentionallyCausedProcess] <Secundary Relation>
7 1 his [SPositionalRelation] <Important Relation>
7 2 Arco di Trionfo <<Construction>> <Secundary Information>
7 7 Vicenza <<GeographicalRegion>> <Important Known Information>
7 15 of a <New Information>
7 17 Roman triumphal arch <<Construction>> <Secundary Information>

Legend: New Information refers to information with a high information value within the text and that is not represented in the ontology.

Important relation refers to a relation in the text which has a primary information value and is also represented in the ontology.

Figure 2:
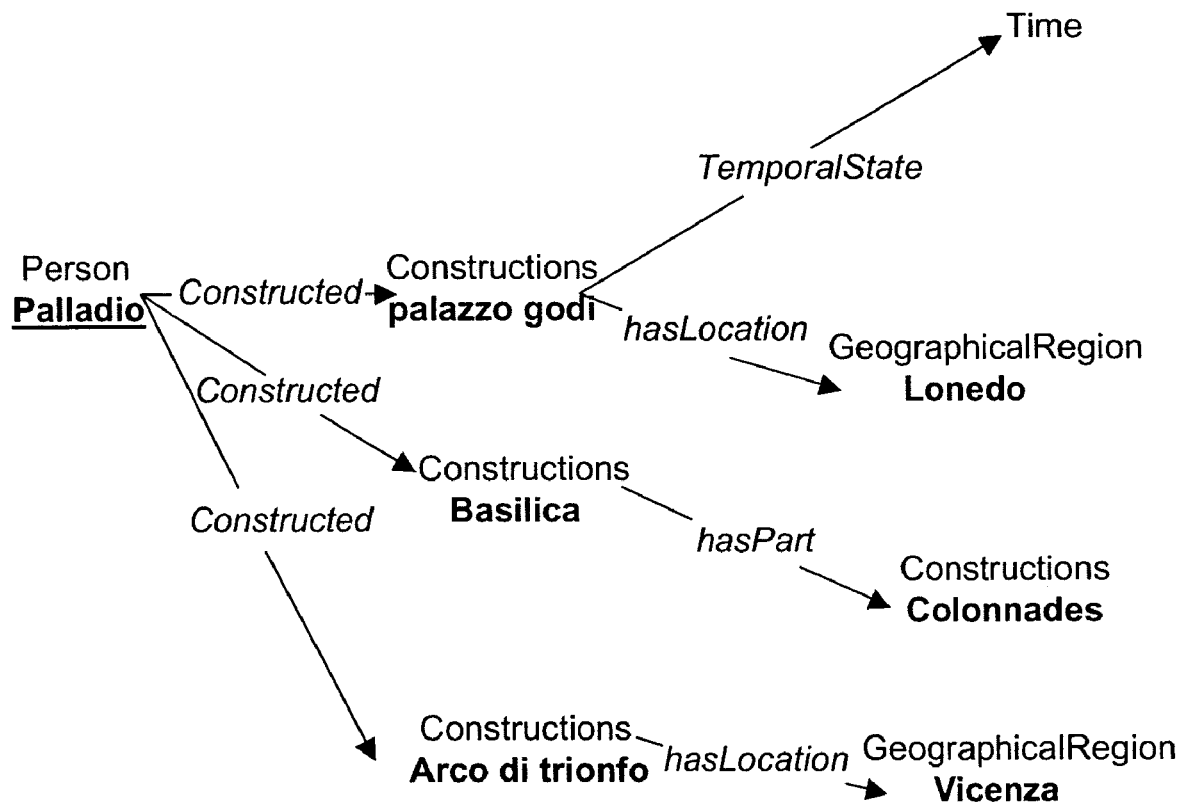

A graphic representation of (part of) the knowledge map of the above text is illustrated in FIG. 2.

From this point on there is an interaction with the end user in solving his knowledge intensive problem. Using the knowledge map as information to deductive reasoning, we can now ask the following questions:

Is there a logical connection between Smith and John Brown?

Is it possible that Palladio build San Marco? (temporal)

Did Palladio work in London?

As an example of formal reasoning for the last question:

```
Get NamePerson (NamePerson)
Get NameGeographicalRegion (NameGeographicalRegion)
For Person (NamePerson)
    Get (*Construction)
        If (hasLocation is Not Empty)
            Get (GeographicalRegion)
                If (GeographicalRegion =
                    NameGeographicalRegion)
                    Return Construction
```

Legend:
*= All.

Notice that in this algorithmic task transcription there is no declarative knowledge represented.

Figure 3:
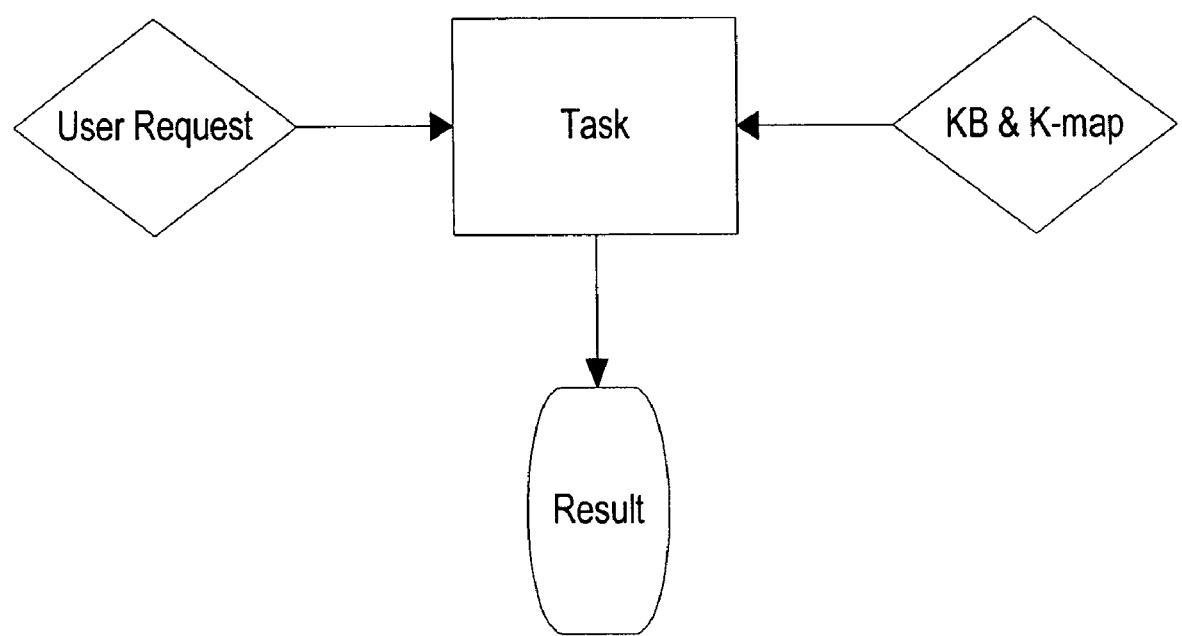
FIG. 3 shows a data flowchart of a reasoning task in accordance with the present invention.

FIG. 3 shows a data flowchart of a reasoning task in accordance with the present invention.

At the Request of User, a reasoning Task is initiated. The task retrieves input form the Knowledge Base (KB) and the Knowledge map (K-map) to complete the reasoning task. The Result of the task is outputted to the user.

The Analysis Engine contains all methods and procedures to generate an information profile of any external source of information. such as a text or linguistic data, video data, sound data, image data, measurement data, control data, tactile data, olfactive data. This is done by building a set of informative sequences likely to describe concepts, relations and states according to their definition in the perceptual dimension, in text these sequences are called N-grams and can consist of a number of one to x words, and a set of basic morphological and syntactic structures that have informational value.

In a first step these informative sequences are provided with a coefficient defining their degree of information. In a second step these informative sequences are transferred to the perceptual engine in order to distinguish Known and Unknown Information and in order to asses concepts and relations.

Next, in a third step, Known Information is analyzed in function of the information coefficient as to important and secondary information in relation to the analyzed information source.

In a fourth step the unknown informative sequences that have a sufficient degree of information are prepared to be identified as New Information. A first attempt to classify this New Information based on its relatedness (perceptual and logical) with known information is made by the analysis engine. The information obtained by the combination of the above described processes is called the Information Profile.

The Perceptual Engine contains the perceptual definition of concepts and relations in the Analysis Engine. These perceptual definitions are classified in accordance with the definitions used in the logical and inference engines.

The Perceptual Engine is arranged and used to build the Information Profile of the information source and for linking same to the other Engines within the Analysis engine.

The Logical Engine is arranged to use the information coming from the Perceptual Engine and/or coming from the Information Profile to verify the logical correctness of the perceptually built information.

The Inference Engine operates to use validated information provided by the Logical Engine, or perceptual information directly linked to its categories, to perform the inference operations. In order to fully execute these inference operations the Inference Engine uses states.

Figure 4:
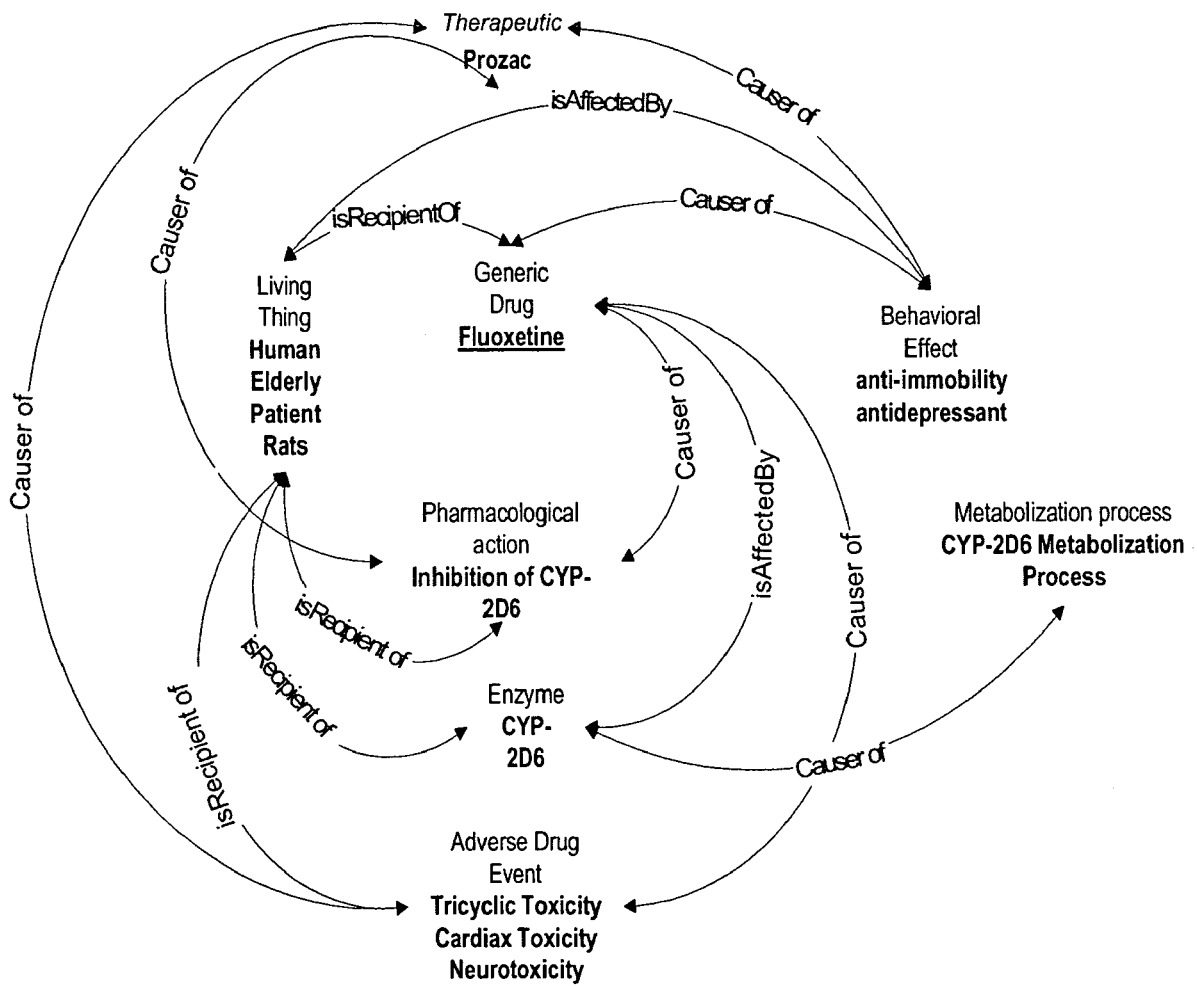
FIG. 4 shows, in a graphic manner, an example of an ontological map in accordance with the present invention.
Figure 5:
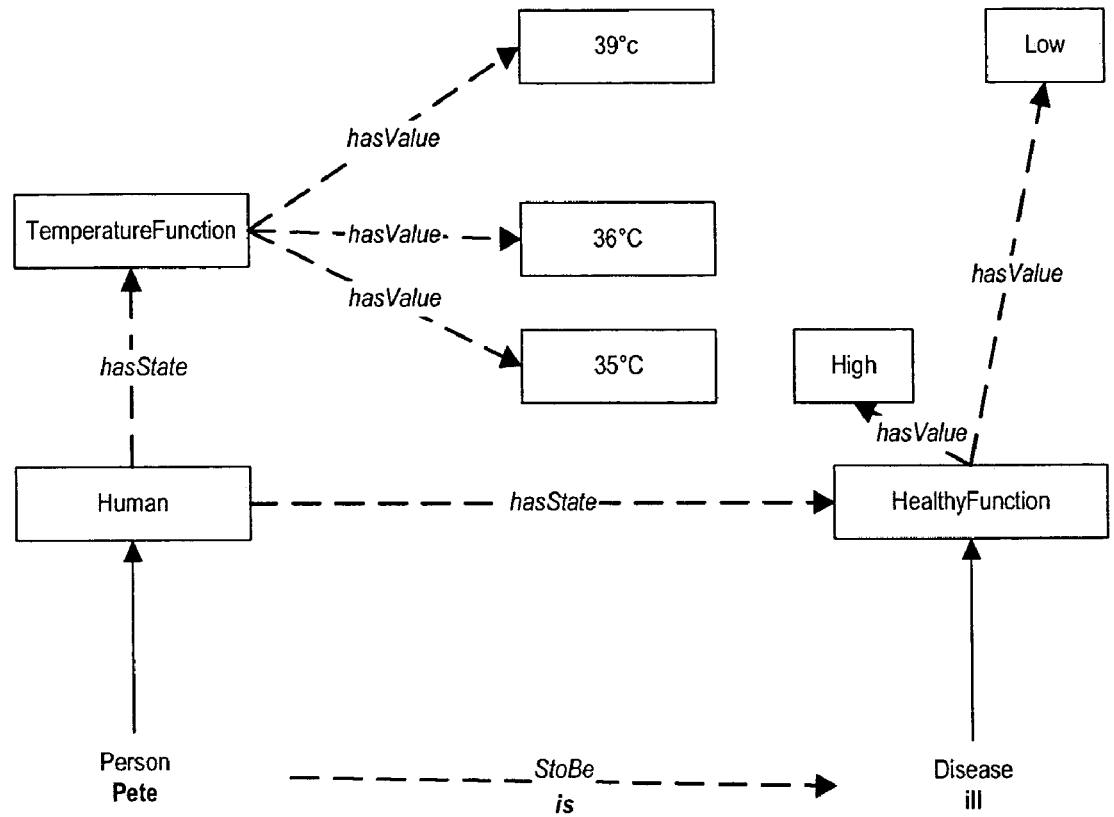
FIG. 5 shows, in a graphic manner, how measurement data can be used as a trigger in a procedure.
Figure 6:
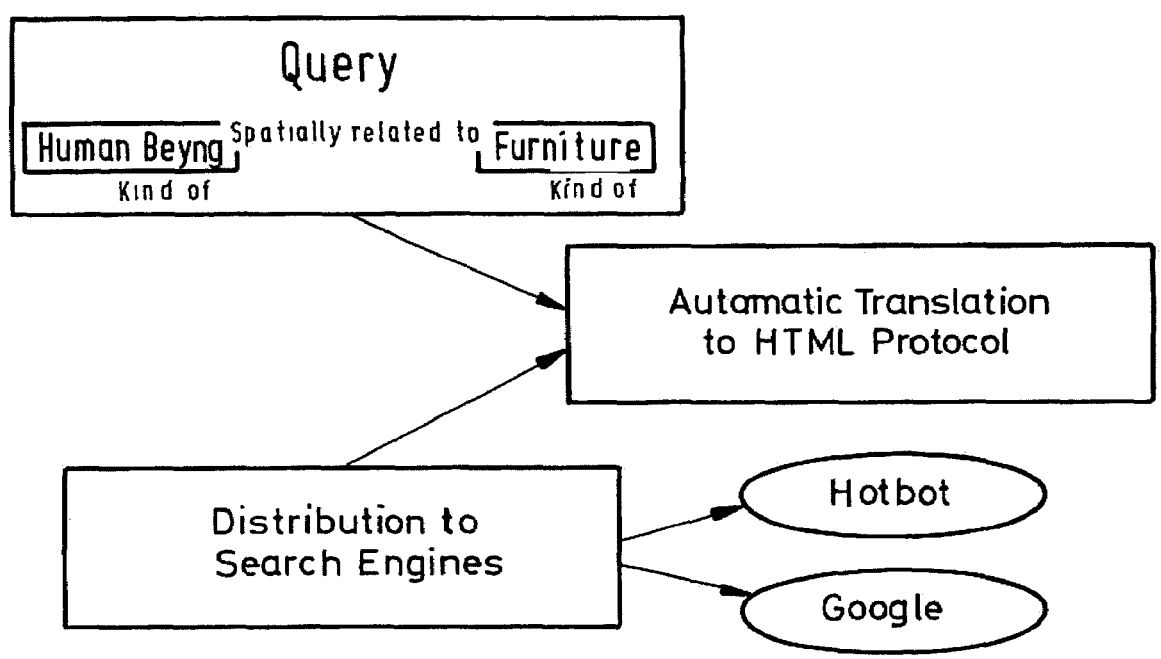
FIG. 6 shows, in a graphic manner, how formulated queries can be distributed to external systems.
Figure 7:
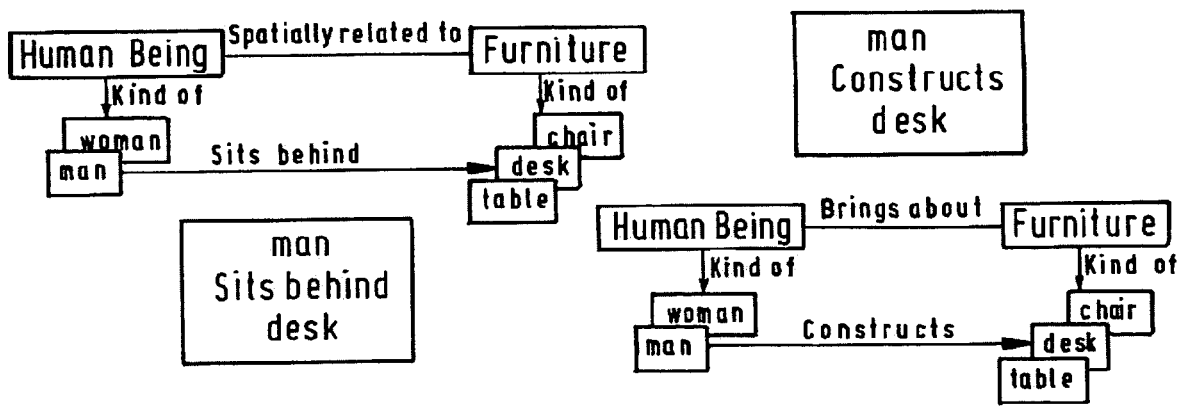
FIG. 7 shows, in a graphic manner, examples of query formulations.
Figure 8:
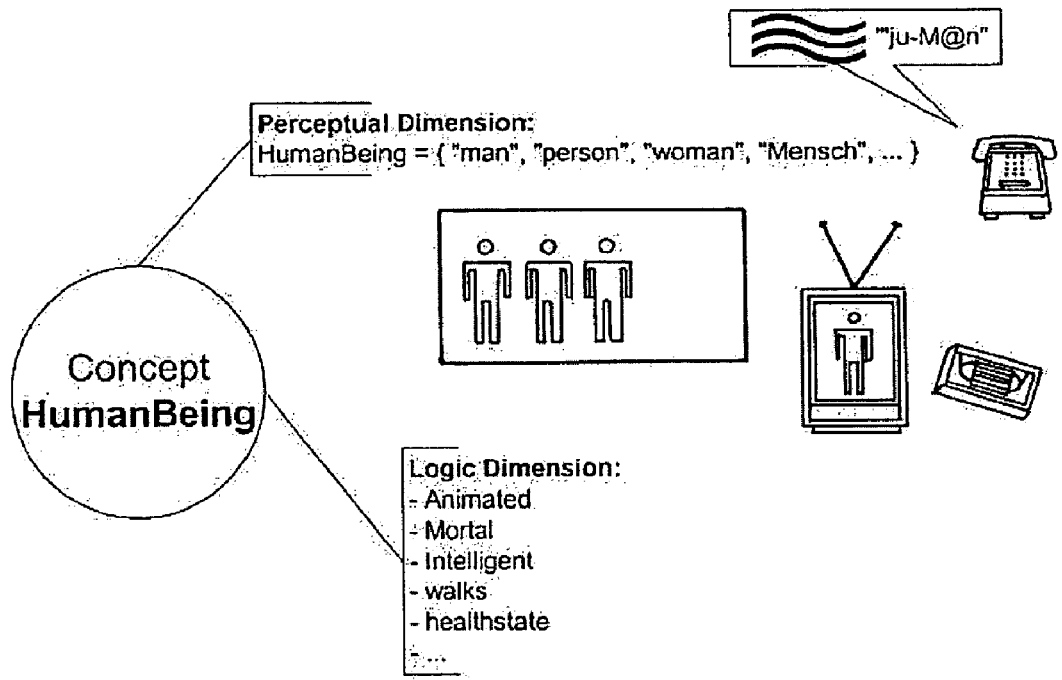
FIG. 8 shows, in a graphic manner, an example of a possible multidimensional concept definition.

FIG. 4 shows in a graphic manner an ontological map in accordance with the present invention in the field of pharmaceutics, representing knowledge at the abstract level of Concept Classes and Relational, Classes. Ontological maps are built by matching the information profile of an information source with the contents of the Analysis engine.

The processes described above and performed by the several engines can be implemented in a single software or computer program which can be run on a commercially available processor system.

FIGS. 5, 6, 7 and 8 show graphic examples of various aspects and elements of the system.

Figure 9:
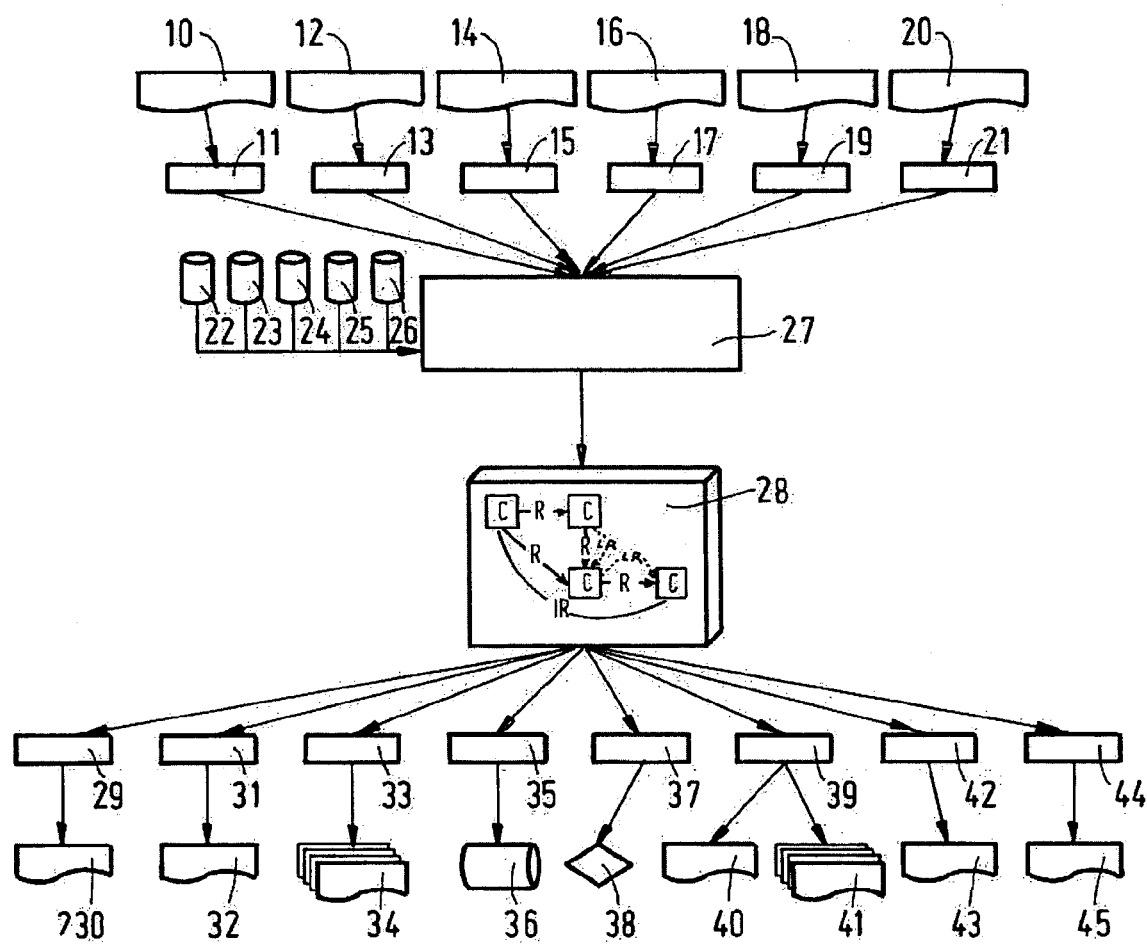
FIG. 9 shows a simplified Input/output scheme of a computer based implementation of the invention.

FIG. 9 gives an overview of possible input data, and resulting output data after being processed. Input is a file, containing text, sound, an image, video, control & measurement data or a query. Processing results in one or more output files, representing the result of the service used.

Input data 10, 12, 14, 16, 18, 20 goes through a pre-processor 11, 13, 15, 17, 19, 21 resulting in the correct data format for the analyses or ontology engine 27. This preprocessor will also remove noise and non-informative data.

The analysis engine 27 uses a concepts and relations database 22, 23 to map the input data to concepts and relations, a CRC and non-CRC database 24, 25 to build the CRC database, and an inference database 26 to construct the inference pathways database.

The output of the engine is a multidimensional ontological map 28 of the input data file, this map is the basis for further knowledge services.

Services are categorization 29, resulting in ranking related to topics 30, visualisation 31, yielding a graphical representation 32 of the multidimensional output, data distribution 33, 34, process analysis 35, 36, decision support 37 resulting in decision advice 38, search 39 delivering a visual answer map 40 and a ranked document list 41.

Further services are summarizing 42, 43 and translating 44, 45.

Figure 10:
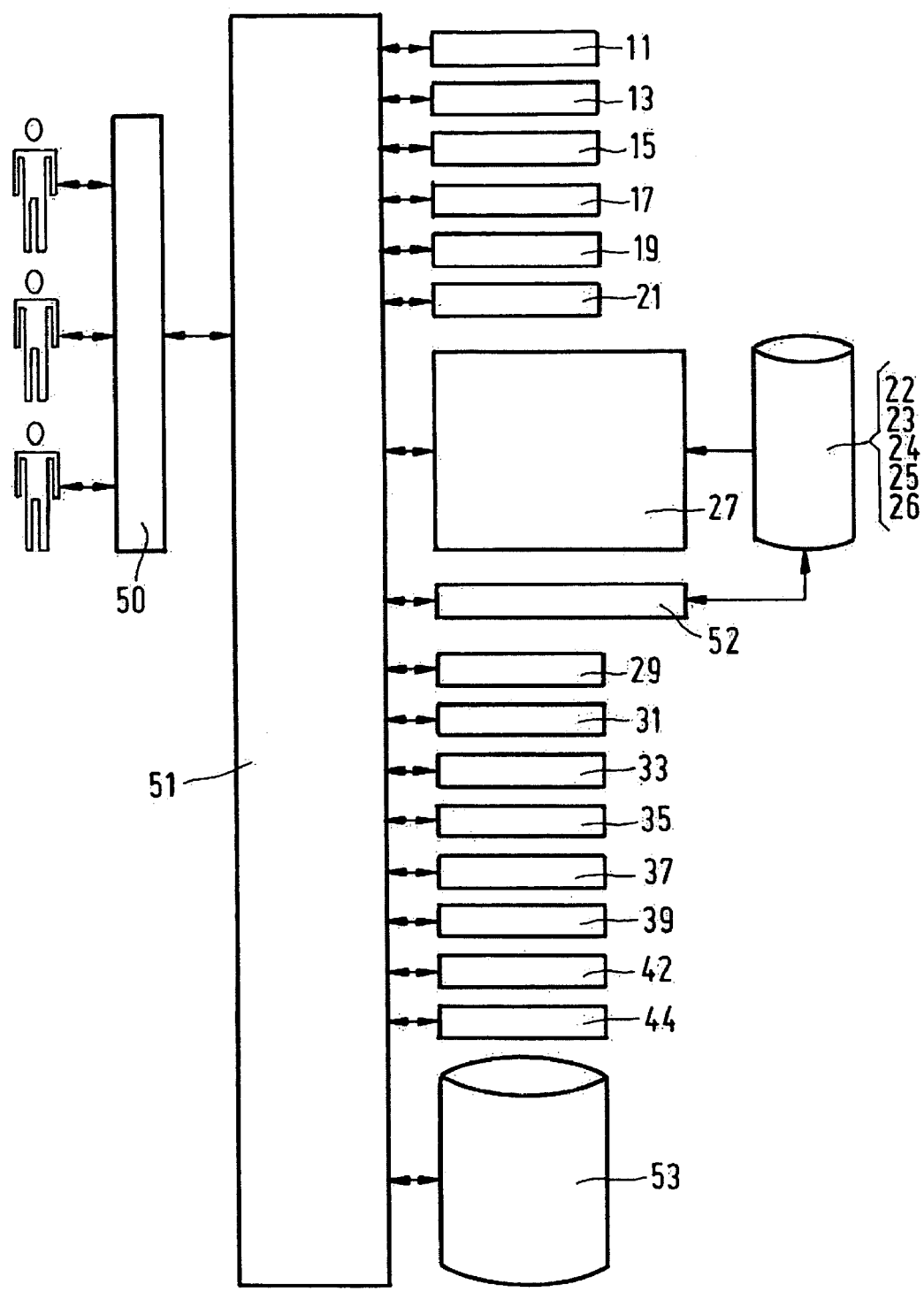
FIG. 10 shows the component overview of the components of a computer based implementation of the invention.

FIG. 10 gives an overview of the components as used in a real-world system. Users communicate with a front-end user interface 50, connected to a managing module 51. Maintaining the knowledge base 22, 23, 24, 25, 26 is done by a separate administrator module 52. Multidimensional output is stored in a repository 53.

Figure 11:
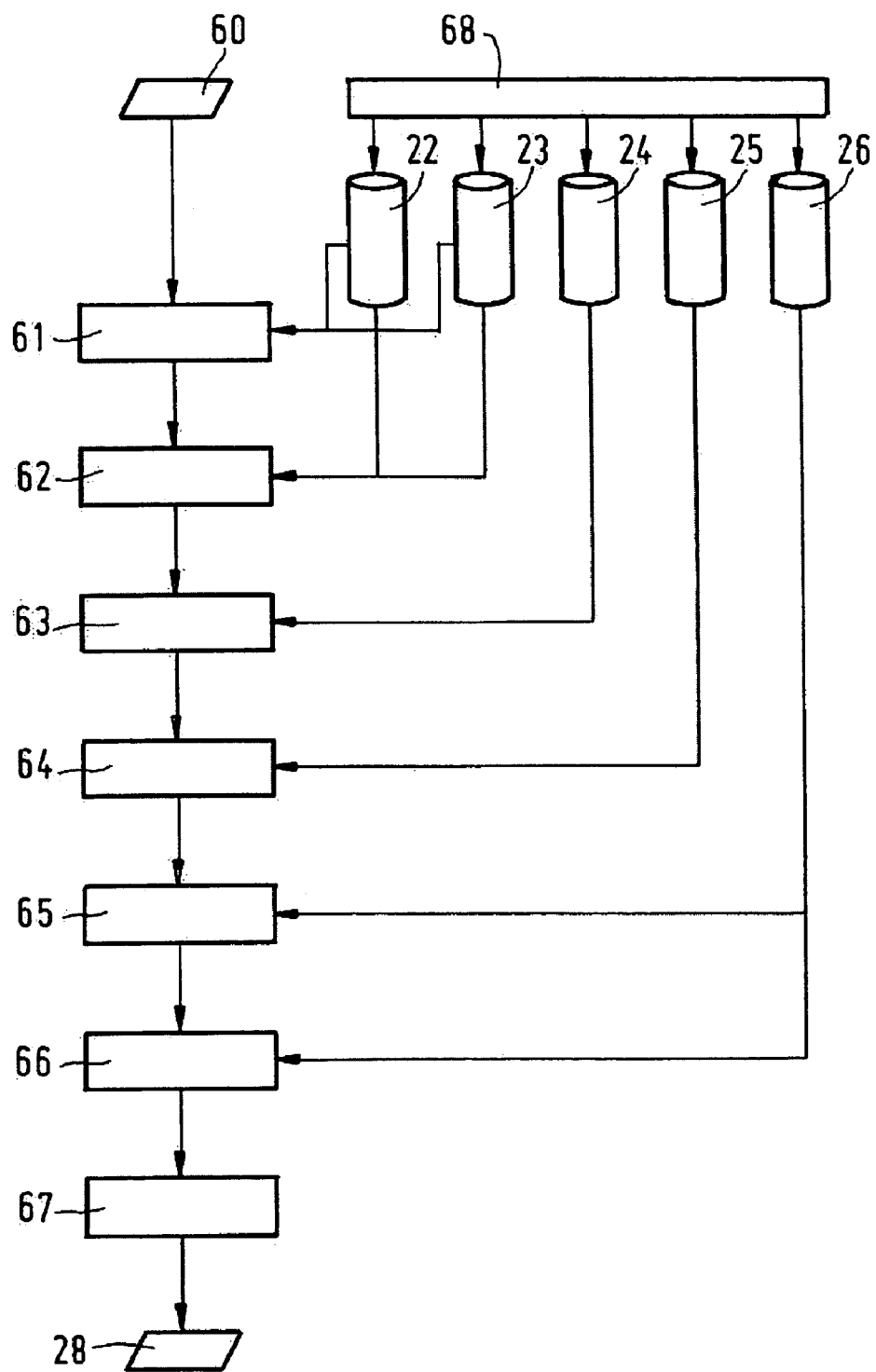
FIG. 11 shows a simplified data flowchart of a computer based implementation of the processing engine described in the invention.

FIG. 11 gives an overview of the analysis engine internals.

Input data 60 as prepared by the preprocessor is mapped to concepts and relations. This mapping is done on a perceptual 61 and a logical level 62, using the concepts and relations database 22, 23.

Following is CRC detection 63 based on the CRC database 24, and CRC filtering 64 based on a CRC exclusion database 25.

Compositionals 65 and Inference pathways 66 are generated based on the Inference database 26.

New CRC's 67, as the basis for a self learning system, are added to the ontological map 28.

Figure 12:
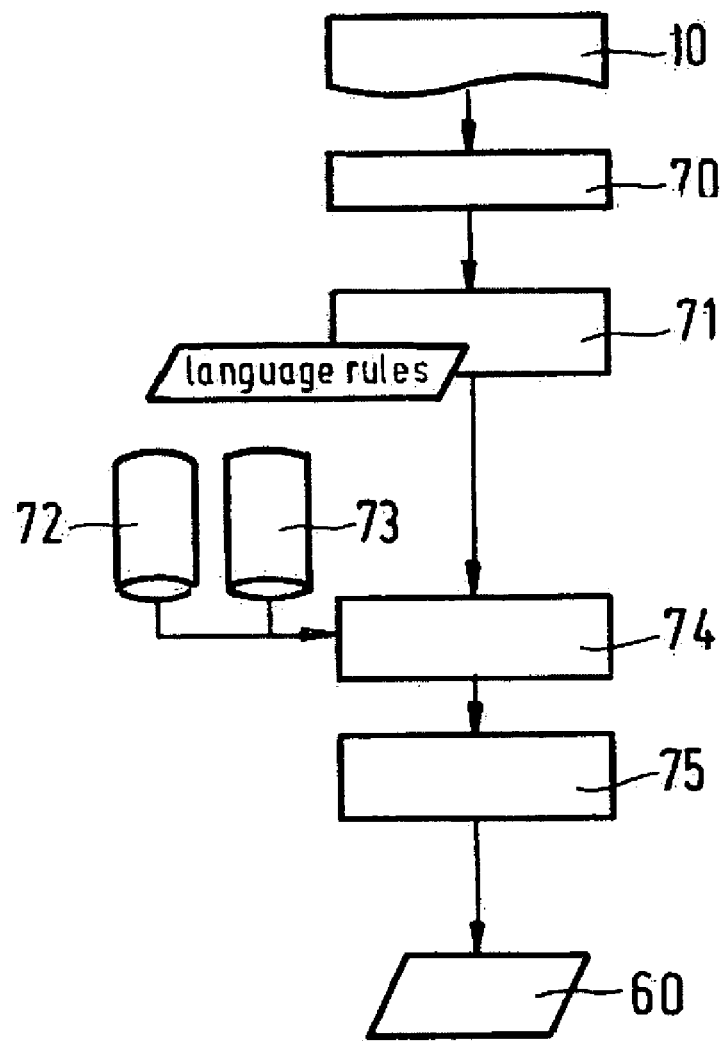
FIG. 12 shows a simplified data flowchart of a computer based implementation of the data preprocessors described in the invention.

FIG. 12 gives an overview of the preprocessor flowchart.

The input file 10 is converted 70 to the correct format. The file is then divided into sensible units 71, for text input these units are sentences, language rules form the basis for detection.

Low information 72 and noise 73 are filtered out 74.

All potential concepts and relations are tagged and formatted 75, and this data 60 is send to the engine.

The invention has been disclosed herein with reference to several examples of text information sources. Those skilled in the art will appreciate that the invention is not limited to such information sources. Other examples and embodiments of the invention will be apparent to persons skilled in the art by reading and consideration of the present specification.

The invention claimed is:

1. A computer controlled method for identifying concepts and relations in different types of data pertaining to at least one application domain, said data including at least one of a group consisting of linguistic data, image data, video data, sound data, control data, measurement data, olfactive and tactile data, said method comprising the steps of:
   defining concepts associated with an application domain, a concept specifies an amount of information relating to said application domain and is expressed in a logical dimension and a perceptual dimension;
   defining relations between said concepts, a relation specifies an informative association between concepts of said application domain in at least one of said logical dimension and said perceptual dimension;
   defining concept-relation-concept (CRC) patterns for said application domain, in said logical and perceptual dimension;
   acquiring data pertaining to said application domain; and
   identifying concepts, relations and CRC patterns in said acquired data in said logical and perceptual dimensions using said concepts, relations and CRC-patterns defined for said application domain when performing a service selected from the group consisting of a data categorization service, a data visualization service, a data distribution service, a decision support service, a data search service, a data summarization service, a data translation service, and a data transformation service.

2. A method according to claim 1, wherein said concepts relations and CRC-patterns are defined in an inference dimension specific for an application domain.

3. A method according claim 1, wherein a CRC-pattern is characterized by having a hierarchical structure defined by said relation and a master concept and a slave concept.

4. A method according to claim 1, wherein said logic dimension comprises a domain specific implicit or explicit logical feature set and wherein said concepts and relations are expressed as subsets of said logical feature set and wherein validity is assessed of said defined CRC-patterns in said logical dimension.

5. A method according to claim 1, wherein said perceptual dimension comprises a domain specific implicit or explicit perceptual feature set and wherein said concepts and relations are expressed as subsets of said perceptual feature set and wherein validity is assessed of said defined CRC-patterns in said perceptual dimension.

6. A method according to claim 1, wherein said concepts relations and CRC-patterns are defined in an inference dimension specific for an application domain, and said inference dimension comprises compositional concepts being domain specific combinations of CRC-patterns in said logical dimension and wherein domain specific combinations are defined of at least one CRC-pattern in said logical dimension and a specific set of perceptual features other than concepts defined in said perceptual dimension and other than relations defined in said perceptual dimension, and wherein validity of said combinations and compositional concepts is assessed.

7. A method according to claim 1, wherein a group of boolean, logical, spatial, temporal and evaluative states is defined, a state being a modifier, refining the information value of a CRC-pattern and having no information value independent from CRC-patterns and wherein states are associated with selected ones of said CRC-patterns, compositional concepts and combinations of CRC-patterns.

8. A method according to claim 1, wherein inference pathways are defined combining selected CRC-patterns, compositional concepts, combinations of CRC-patterns and compositional concepts having associated states, and wherein valid sequences of states associated to a pathway are defined.

9. A method according to claim 1, wherein data pertaining to an application domain is analyzed following the steps of:
   identifying in said data concepts and relations as defined in said logical and perceptual dimensions;
   forming CRC-patterns in said logical and perceptual dimensions of said concepts and relations identified in said data, and
   assessing said CRC-patterns as to their validity in said logical and perceptual dimensions of an application domain.

10. A method according to claim 9, further comprising the steps of:
    forming and assessing domain specific combinations of CRC-patterns in said logical dimension, and
    assessing combinations of CRC-patterns using domain specific combinations of at least one CRC-pattern in said logical dimension and a specific set of perceptual features other than concepts defined in said perceptual dimension and other than relations defined in said perceptual dimension.

11. A method according to claim 9, wherein said concepts relations and CRC-patterns are defined in an inference dimension specific for an application domain, further comprising the steps of:
    forming and building inference pathways by combining selected CRC-patterns, compositional concepts and combinations of CRC-patterns and compositional concepts having associated states;
    forming a sequence of states by combining individual states associated with CRC-patterns and compositional concepts in an inference pathway, and
    assessing said sequence of states according to valid sequences of states associated with said pathway.

12. A method according to claim 1, wherein new concepts and relations other than said defined concepts and relations are established from said data and said new concepts and relations are matched with defined concepts and relations based on logical and perceptual feature convergence and difference in a domain.

13. A method according to claim 1, wherein application domains are related to each other according to convergence of their feature sets in said logical and perceptual dimensions, and of their definitions of said concepts, relations and CRC-patterns in said logical and perceptual dimensions and wherein data pertaining to different application domains are combined in accordance with said relatedness of said domains.

14. A method according to claim 1, wherein new concepts and relations are combined with each other and with defined concepts and relations defining new CRC-patterns and wherein said new CRC-patterns are assessed according to their compliance with logical and perceptual feature sets in a domain.

15. A method according to claim 1, wherein selected new CRC-patterns are added to said defined CRC-patterns for said application domain.

16. A method according to claim 1, wherein said concepts relations and CRC-patterns are defined in an inference dimension specific for an application domain, and wherein assessed CRC-patterns, assessed compositional concepts and assessed combinations of CRC-patterns are combined into clusters expressed in said logical, perceptual and inference dimensions representing said data, by analyzing information parts of said data using concepts and relations common to said CRC-patterns, compositional concepts and combinations of CRC-patterns.

17. A method according to claim 16, wherein new CRC-patterns are added to clusters based on concepts and relations common to said clusters.

18. A method according to claim 16, wherein clusters are combined into a scheme representing said data based on concepts and relations common to said clusters.

19. A method according to claim 16, wherein clusters are combined into a scheme representing said data based on concepts and relations common to said clusters and wherein said scheme is arranged according to at least one of cluster length, frequency of appearance of clusters, frequency of appearance of concepts, frequency of appearance of relations, frequency of appearance of concepts and relations in a cluster and information value of concepts, relations, and combinations of concepts and relations in CRC-patterns and clusters.

20. A method according to claim 1, wherein different data types are associated in a formal and informative manner based on said definitions of concepts, relations and CRC-patterns in said logical, perceptual and inference dimensions.

21. A method according to claim 1, comprising the steps of:
defining at least one field of interest consisting of selected CRC-patterns;
assigning to each of said CRC-patterns an information value typical for a field of interest
assessing analyzed data as to its compliance with said field of interest by comparing CRC-patterns representing said analyzed data and said field of interest, providing a compliance factor, and
calculating a field correlation factor using said information value and said compliance factor.

22. A method according to claim 21, wherein said correlation factor is calculated for a plurality of different fields of interest.

23. A method according to claim 1, comprising the steps of:
defining at least one user profile consisting of selected CRC-patterns;
assigning to each of said CRC-patterns an information value typical for a field of interest
assessing analyzed data as to its compliance with said user profile by comparing CRC-patterns representing said analyzed data and said field of interest, providing a compliance factor, and
calculating a user correlation factor using said information value and said compliance factor.

24. A method according to claim 23, wherein said user profile is either one of a subset and a superset of either one of at least one field of interest and at least one application domain.

25. A method according to claim 23, wherein said correlation factor is calculated for a plurality of different user profiles.

26. A method according to claims 21, wherein analyzed data are categorized in accordance with said field correlation factor and distributed according to said user correlation factor.

27. A method according to claim 1, wherein said concepts relations and CRC-patterns are defined in an inference dimension specific for an application domain, and wherein an application domain is visualized by forming clusters of concepts and relations defined in said logical, perceptual and inference dimensions and associated states.

28. A method according to claim 27, wherein schemes of clusters are combined with said domain visualizations based on concepts and relations common to said schemes and domain visualizations.

29. A method according to claim 1, wherein presence of structures of co-occurring CRC-patterns in analyzed data is detected, and wherein recurring sequences of states associated with said structures are assessed.

30. A method according to claim 1, wherein detected structures of co-occurring CRC-patterns and sequences of associated states are combined into inference pathways and inference pathways are defined as processes if said sequence of associated states determines a dependancy between concepts at both ends of a pathway.

31. A method according to claim 30, wherein procedures are defined as specific combinations of processes and determined by specific sequences of associated states.

32. A method according to claim 30, wherein processes and procedures are used for categorizing and distributing analyzed data.

33. A method according to claim 30, wherein at least one procedure and at least one trigger are combined into a task, a trigger being any of a specific perceptual concept and a specific state, and wherein said task is performed by executing said at least one procedure in response to said at least one trigger.

34. A method according to claim 1, wherein data are searched in function of a query comprising at least one of a specified concept, a specified combination of a concept and a relation, a specified CRC-pattern, a specified compositional concept, a specified inference pathway, a specified process, a specified procedure and specified combinations thereof in at least one of said logical, perceptual and inference dimensions.

35. A method according to claim 34, wherein a broad search is based on the definition of all concepts and relations of said query in said logical dimension and implies all perceptual features of said concepts and said relations and wherein a narrow search is based on at least one specified feature of all concepts and relations of said query pertaining to the definition of said concepts and said relations in said perceptual dimension and a combined search is based on the definition in said logical dimension of at least one of said concepts and relations of said query and of said definition of at least one specified feature in said perceptual dimension of at least one of said other concepts and relations of said query.

36. A method according to claim 34, wherein a complete set of boolean search strings describing said queries is generated.

37. A method according to claim 1, wherein a summary of analyzed data is generated based on clusters of CRC-patterns, selected in accordance with a specified level of information value, of concepts and relations in an analysis scheme of said data, and wherein said selected clusters are adapted into a correct representation in at least one of said data types comprised in said perceptual dimension.

38. A method according to claim 1, wherein data, analyzed into clusters of CRC-patterns, of a first data type comprised in said perceptual dimension is transformed in to a correct representation in at least one second data type comprised in said perceptual dimension, by replacing analyzed feature sets of said first data type defining said clusters with features sets of said perceptual dimension pertaining to said second data type describing the same clusters and referring to the same concepts and relations defined in said logical dimension.

39. A method according to claim 38, wherein analyzed data of the linguistic data type, the video data type and the sound data type belonging at least partially to at least one natural language covered by the feature set defining said perceptual dimension are translated into a correct representation in another natural language covered by the feature set defining said perceptual dimension.

40. A method according to claim 1, comprising the steps of:
converting data of one of the types comprised in said perceptual dimension having any file format into a format for processing said data type,
detecting information parts within said converted data
removing non-informative data from said information parts by assessing them against predefined non-informative data,
determining frequency of occurrence of informative data and rerating said frequency of certain predefined informative data, providing rated information blocks, and
organizing said rated information blocks into data for analyzing same using said concepts and said relations.

41. A computer controlled system for identifying concepts and relations in different types of data pertaining to at least one application domain, said data including at least one of a group consisting of linguistic data, image data, video data, sound data, control data, measurement data, olfactive and tactile data, said system comprising:
a concepts repository comprising concepts associated with an application domain, a concept specifying an amount of information relating to said application domain and expressed in a logical dimension and a perceptual dimension;
a relations repository comprising relations between said concepts, a relation specifying an informative association between concepts of said application domain in at least one of said logical dimension and said perceptual dimension;
a CRC-pattern repository comprising CRC-patterns defined for said application domain, in said logical and perceptual dimension, and
an analysis engine for acquiring data pertaining to said application domain and arranged for identifying concepts, relations and CRC patterns in said acquired data in said logical and perceptual dimensions using said concepts, relations and CRC-patterns defined for said application domain when performing a service selected from the group consisting of a data categorization service, a data visualization service, a data distribution service, a decision support service, a data search service, a data summarization service, a data translation service, and a data transformation service.

42. A system according to claim 41, having an inference repository comprising said concepts relations and CRC-patterns expressed in an inference dimension specific for an application domain.

43. A system according to claim 41, wherein said concept repository and relation repository comprise a domain specific logical feature set and wherein said concepts and relations are expressed as subsets of said logical feature set.

44. A system according to claim 41, wherein said analysis engine is arranged for assessing validity of said CRC-patterns in said logical dimension.

45. A system according to claim 41, wherein said concept repository and relation repository comprise a domain specific perceptual feature set, and wherein said concepts and relations are expressed as subsets of said perceptual feature set.

46. A system according to claim 45, wherein said analysis engine is arranged for assessing validity of said CRC-patterns in said perceptual dimension.

47. A system according to claim 41, having an inference repository comprising said concepts relations and CRC-patterns expressed in an inference dimension specific for an application domain, and wherein said inference repository comprises compositional concepts defined as domain specific combinations of CRC-patterns in said logical dimension and comprising domain specific combinations of at least one CRC-pattern in said logical dimension and a specific set of perceptual features other than concepts defined in said perceptual dimension and other than relations defined in said perceptual dimension.

48. A system according to claim 47, wherein said analysis engine is arranged for assessing validity of said combinations and compositional concepts in said inference dimension.

49. A system according to claim 41, having an inference repository comprising said concepts relations and CRC-patterns expressed in an inference dimension specific for an application domain, and wherein at least one state—a state being a modifier, refining the information value of a CRC-pattern and having no information value independent from CRC-patterns—of a group of boolean, logical, spatial, temporal and evaluative states is associated with selected ones of said CRC-patterns, compositional concepts and combinations of CRC-patterns of said inference repository.

50. A system according to claim 49, wherein said inference repository comprises inference pathways consisting of combinations of selected CRC-patterns, compositional concepts, combinations of CRC-patterns and compositional concepts having associated states, and comprising valid sequences of states associated to a pathway.

51. A system according to claim 41, wherein said analysis engine comprises:
a logical engine arranged for identifying in said data concepts and relations defined in said logical dimension;
a perceptual engine arranged for identifying in said data concepts and relations defined in said perceptual dimension, and
CRC-pattern assessment means arranged for identifying said CRC-patterns as to their definitions in said logical and perceptual dimensions of an application domain.

52. A system according to claim 51, further comprising a logical exclusions repository comprising combinations of concepts and relations providing invalid CRC-patterns and wherein said analysis engine comprises invalid logical CRC-pattern detection means excluding invalid CRC-patterns.

53. A system according to claim 51, wherein said analysis engine comprises an inference engine arranged for:
forming and assessing domain specific combinations of CRC-patterns in said logical dimension, and
assessing defined compositional concepts and assessing combinations of CRC-patterns using domain specific combinations of at least one CRC-pattern in said logical dimension and a specific set of perceptual features other than concepts defined in said perceptual dimension other than relations defined in said perceptual dimension.

54. A system according to claim 53, wherein said inference engine further comprises means arranged for:
forming and building inference pathways by combining selected CRC-patterns, compositional concepts and combinations of CRC-patterns and compositional concepts having associated states;
forming a sequence of states by combining individual states associated with CRC-patterns and compositional concepts in an inference pathway, and
assessing said sequence of associated states according to valid sequences of states associated with said pathway.

55. A system according to claim 41, comprising means for: establishing new concepts and relations other than said defined concepts and relations in said data, and matching said new concepts and relations with defined concepts and relations based on logical and perceptual feature convergence and difference in a domain.

56. A system according to claim 55, wherein said means for matching new concepts and relations are arranged for:
combining said new concepts and relations with each other and with defined concepts and relations to define new CRC-patterns, and
assessing said new CRC-patterns according to their compliance with logical and perceptual feature sets in a domain.

57. A system according to claim 41, comprising means to add selected new CRC-patterns to said defined CRC-patterns in said CRC-patterns repository.

58. A system according to claim 41, comprising a categorization engine arranged for:
defining at least one field of interest consisting of selected CRC-patterns;
assigning to each of said CRC-patterns an information value typical for a field of interest
assessing analyzed data as to its compliance with said field of interest by comparing CRC-patterns representing said analyzed data and said field of interest, providing a compliance factor, and
calculating a field correlation factor using said information value and said compliance factor.

59. A system according to claim 58, wherein said categorization engine is arranged for calculating said correlation factor for a plurality of different fields of interest.

60. A system according to claim 58, wherein said categorization engine is arranged for:
defining at least one user profile consisting of selected CRC-patterns;
assigning to each of said CRC-patterns an information value typical for a field of interest;
assessing analyzed data as to its compliance with said user profile by comparing CRC-patterns representing said analyzed data and said field of interest, providing a compliance factor, and
calculating a user correlation factor using said information value and said compliance factor.

61. A system according to claim 58, wherein said categorization engine is arranged for calculating said correlation factor for a plurality of different user profiles.

62. A system according to claim 58, wherein said categorization engine is arranged for categorizing said analyzed data in accordance with said field correlation factor.

63. A system according to claim 58, comprising a distribution engine arranged for distributing said analyzed data in accordance with said user correlation factor.

64. A system according to claim 41, having an inference repository comprising said concepts relations and CRC-patterns expressed in an inference dimension specific for an application domain, and comprising a vizualisation engine arranged for vizualising an application domain by forming clusters of concepts and relations defined in said logical, perceptual and inference dimensions and associated states.

65. A system according to claim 53, wherein said vizualisation engine is arranged for combining assessed CRC-patterns, assessed compositional concepts and assessed combinations of CRC-patterns into clusters expressed in said logical, perceptual and inference dimensions representing said data, by analyzing information parts of said data using concepts and relations common to said CRC-patterns, compositional concepts and combinations of CRC-patterns.

66. A system according to claim 64, wherein said vizualisation engine is arranged for adding new CRC-patterns to clusters based on concepts and relations common to said clusters.

67. A system according to claim 64, wherein said vizualisation engine is arranged for combining clusters into a scheme representing said data based on concepts and relations common to said clusters.

68. A system according to claim 64, wherein said vizualisation engine is arranged for combining clusters into a scheme representing said data based on concepts and relations common to said clusters, for composing said scheme in accordance with at least one of cluster length, frequency of appearance of clusters, frequency of appearance of concepts, frequency of appearance of relations, frequency of appearance of concepts and relations in a cluster and information value of concepts, relations, and combinations of concepts and relations in CRC-patterns and clusters.

69. A system according to claim 64, wherein said vizualisation engine is arranged for combining said schemes of clusters with said domain vizualisations based on concepts and relations common to said schemes and domain visualizations.

70. A system according to claim 41, comprising a process analysis engine arranged for assessing presence of structures of co-occurring CRC-patterns in analyzed data, and for assessing recurring sequences of states associated with said structures.

71. A system according to claim 70, wherein said process analysis engine is arranged for detecting structures of co-occurring CRC-patterns and for combining sequences of associated states into inference pathways, inference pathways are defined as processes if said sequence of associated states determines a dependency between concepts at both ends of a pathway.

72. A system according to claim 70, wherein said process analysis engine is arranged for detecting procedures as specific combinations of processes and specific sequences of associated states.

73. A system according to claim 70, wherein said categorization engine is arranged for categorizing analyzed data according to said processes and said procedures.

74. A system according to claim 70, wherein said distribution engine is arranged for distributing analyzed data according to said processes and said procedures.

75. A system according to claim 74, comprising a decision advice engine arranged for combining at least one procedure and at least one trigger into a task, a trigger being any of a specific perceptual concept and a specific state, and for performing said task by executing said at least one procedure in response to said at least one trigger.

76. A system according to claim 41, comprising a search engine arranged for searching data in function of a query comprising at least one of a specified concept, a specified combination of a concept and a relation, a specified CRC-pattern, a specified compositional concept, a specified inference pathway, a specified process, a specified procedure and specified combination thereof in at least one of said logical, perceptual and inference dimensions.

77. A system according to claim 76, wherein said search engine is arranged for performing a broad search based on the definition of all concepts and relations of said query in said logical dimension and implies all perceptual features of said concepts and said relations, a narrow search based on at least one specified feature of all concepts and relations of said query pertaining to the definition of said concepts and said relations in said perceptual dimension, and a combined search based on the definition in said logical dimension of at least one of the concepts and relations of said query and of the definition of at least one specified feature in said perceptual dimension of at least one of the other concepts and relations of said query.

78. A system according to claim 76, wherein said search engine is arranged for generating a complete set of boolean search strings describing said queries.

79. A system according to claim 41, comprising a summarizing engine arranged for generating a summary of analyzed data based on clusters of CRC-patterns, selected in accordance with a specified level of information value, of concepts and relations in an analysis scheme of said data and for adapting said selected clusters into a correct representation in at least one of the data types comprised in said perceptual dimension.

80. A system according to claim 41, comprising a translation engine arranged for transforming data, analyzed into clusters of CRC-patterns, of a first data type comprised in said perceptual dimension into a correct representation in at least one second data type comprised in said perceptual dimension, by replacing analyzed feature sets of said first data type defining said clusters with features sets of said perceptual dimension pertaining to said second data type describing the same clusters and referring to the same concepts and relations defined in said logical dimension.

81. A system according to claim 80, wherein said translation engine is arranged for translating analyzed data of the linguistic data type, the video data type and the sound data type belonging at least partially to at least one natural language covered by the feature set defining said perceptual dimension into a correct representation in an other natural language covered by the feature set defining said perceptual dimension.

82. A system according to claim 41, comprising a plurality of preprocessing engines, each preprocessing engine being arranged for preprocessing one of said data types defined in said perceptual dimension by:
 converting data of one of said data types comprised in said perceptual dimension having any file format into a format for processing said data type;
 detecting information parts within said converted data;
 removing non-informative data from said information parts by assessing them against predefined non-informative data;
 determining frequency of occurrence of informative data and rerating said frequency of certain predefined informative data, providing rated information blocks, and
 organizing said rated information blocks into data for analyzing same using said concepts and said relations.

83. A system according to claim 41, comprising an updating engine arranged for updating said concepts repository, said relations repository, said CRC-patterns repository, said logical exclusions repository and said inference repository by adding new concepts, relations, CRC-patterns, compositional concepts, combinations of CRC-patterns, inference pathways, processes and procedures.

84. A computer program product comprising a computer program arranged for performing a method according to claim 1, if loaded into a memory of an electronic processing device.

85. A computer program product according to claim 84, comprising any of a group of data carrying devices including floppy discs, CO-roms, DVDs, tapes, memory stick devices, zip drives, flash memory cards, remote access devices, hard disks, semi-conductor memory devices, programmable semi-conductor memory devices, optical disks, magneto-optical data storage devices, and ferro electric data storage devices.

* * * * *